US012726737B2

(12) United States Patent
Lee et al.

(10) Patent No.: US 12,726,737 B2
(45) Date of Patent: Sep. 1, 2026

(54) IMAGE SENSOR AND OPERATING METHOD THEREOF

(71) Applicant: Samsung Electronics Co., Ltd., Suwon-si (KR)

(72) Inventors: Seungyeob Lee, Suwon-si (KR); Sunah Park, Suwon-si (KR); Youngho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 49 days.

(21) Appl. No.: 19/016,493

(22) Filed: Jan. 10, 2025

(65) Prior Publication Data

US 2025/0338039 A1 Oct. 30, 2025

(30) Foreign Application Priority Data

Apr. 24, 2024 (KR) ........................ 10-2024-0055013
Aug. 14, 2024 (KR) ........................ 10-2024-0108966

(51) Int. Cl.

*H04N 25/76* (2023.01)
*H04N 23/60* (2023.01)
*H04N 25/71* (2023.01)
*H04N 25/78* (2023.01)

(52) U.S. Cl.

CPC ....... *H04N 25/7795* (2023.01); *H04N 23/665* (2023.01); *H04N 25/71* (2023.01); *H04N 25/745* (2023.01); *H04N 25/78* (2023.01)

(58) Field of Classification Search

CPC .... H04N 23/665; H04N 25/71; H04N 25/745; H04N 25/7795; H04N 25/78

See application file for complete search history.

(56) References Cited

U.S. PATENT DOCUMENTS

| | | | |
|---|---|---|---|
| 10,296,065 | B2 | 5/2019 | Lee et al. |
| 10,303,203 | B2 | 5/2019 | Jeon et al. |
| 10,430,372 | B2 | 10/2019 | Jeon et al. |
| 10,503,674 | B2 | 12/2019 | Jeon et al. |
| 10,587,265 | B2 | 3/2020 | Shon et al. |
| 10,901,452 | B2 | 1/2021 | Choi et al. |
| 10,928,849 | B2 | 2/2021 | Jeon et al. |
| 10,969,854 | B2 * | 4/2021 | Lee .......................... G06F 1/06 |
| 11,314,278 | B2 | 4/2022 | Jeon et al. |
| 11,340,685 | B2 | 5/2022 | Lee et al. |

(Continued)

*Primary Examiner* — Lin Ye
*Assistant Examiner* — Chriss S Yoder, III
(74) *Attorney, Agent, or Firm* — Fish & Richardson P.C.

(57) ABSTRACT

An image sensor includes a readout circuit configured to convert electrical signals received from a pixel array into image data, and an image signal processor configured to process the image data. The image signal processor includes a clock consumer configured to generate a first clock request signal and receive a first clock signal, a block clock management unit configured to receive the first clock request signal from the clock consumer, generate a second clock request signal corresponding to the first clock request signal, and receive a clock response signal and a second clock signal corresponding to the second clock request signal, and a top clock management unit configured to receive the second clock request signal from the block clock management unit, generate the clock response signal and the second clock signal, and transmit the clock response signal and the second clock signal to the block clock management unit.

20 Claims, 16 Drawing Sheets

(56) References Cited

U.S. PATENT DOCUMENTS

| | | | |
|---|---|---|---|
| 11,592,861 | B2 | 2/2023 | Lee et al. |
| 11,747,853 | B2 | 9/2023 | Jeon et al. |
| 11,789,515 | B2 | 10/2023 | Lee et al. |
| 11,860,687 | B2 | 1/2024 | Lee et al. |
| 2023/0104271 | A1 | 4/2023 | Yoo et al. |
| 2024/0012446 | A1 | 1/2024 | Lee et al. |

* cited by examiner

FIG. 5B

Active
Vblank
(t1)
(t1-1)
(t1-2)
(t1-3)
(t2)
Start Signal
REQ1-1
REQ1-2
REQ1
ACK1
CLK1
CLK1-1
CLK1-2

Analog Control Logic
140
Start Signal
BLK1
130-1
1201-1
1201-2
1201-3
1201-4
1201-5
Clock Consumer1-1
Clock Consumer1-2
Clock Consumer1-3
Clock Consumer1-4
Clock Consumer1-5
CLK1-1
REQ1-2
CLK1-2
CLK1-3
REQ1-4
CLK1-4
REQ1-5
CLK1-5
OR
170
Block CMU1
1301-2
1301-4
1301-5
1302-2
1302-4
1302-5
Adapter1-2
Adapter1-4
Adapter1-5
G1-2
G1-4
G1-5
110
REQ1/ACK1(CH1)
CLK1
Top CMU

IMAGE SENSOR AND OPERATING METHOD THEREOF

CROSS-REFERENCE TO RELATED APPLICATIONS

This application is based on and claims priority under 35 USC § 119 to Korean Patent Application No. 10-2024-0055013, filed on Apr. 24, 2024 in the Korean Intellectual Property Office, and Korean Patent Application No. 10-2024-0108966, filed on Aug. 14, 2024 in the Korean Intellectual Property Office, the disclosures of each of which are incorporated by reference herein in their entirety.

BACKGROUND

The inventive concepts relate to image processing, and more particularly, to image sensors providing a clock required for image processing through a clock management unit, and operating methods thereof.

Recently, as the performance of image sensors has improved, image sensors have been widely used in various home appliances other than portable devices such as smartphones and digital cameras. In the field of mobile devices, research has been actively conducted to reduce power consumption of image sensors.

Image data provided from an image sensor is configured in units of frames and may have a signal indicating the start of a frame.

SUMMARY

Some example embodiments of the inventive concepts provide an image sensor and an operating method thereof, capable of reducing power and reducing or minimizing latency of clock supply when supplying a clock to the image sensor. An image sensor according to some example embodiments may be configured to guarantee that no image data is input during a period between processing the last image data of a current frame and processing first image data of the next frame. The image sensor may be configured to control a clock in a way suitable for the image sensor (e.g., to enable image processing operations by the image sensor), while reducing or minimizing power consumption based on taking advantage of the characteristics of the image sensor.

According to some example embodiments of the inventive concepts, an image sensor may include a pixel array including a plurality of sensing pixels, a readout circuit configured to convert electrical signals received from the pixel array into image data, and an image signal processor configured to process the image data output from the readout circuit. The image signal processor may include a clock consumer, a block clock management unit, and a top clock management unit. The clock consumer may be configured to generate a first clock request signal and receive a first clock signal corresponding to the first clock request signal. The block clock management unit may be configured to receive the first clock request signal from the clock consumer, generate a second clock request signal corresponding to the first clock request signal, and receive a clock response signal and a second clock signal corresponding to the second clock request signal. The top clock management unit may be configured to receive the second clock request signal from the block clock management unit, generate the clock response signal and the second clock signal corresponding to the second clock request signal, and transmit the clock response signal and the second clock signal to the block clock management unit. The block clock management unit may be configured to generate the first clock signal corresponding to the first clock request signal, based on the second clock signal, and transmit the first clock signal to the clock consumer.

According to some example embodiments of the inventive concepts, an image sensor may include a plurality of clock consumers, a block clock management unit, and a top clock management unit. The plurality of clock consumers may each be configured to generate a first clock request signal and receive a first clock signal corresponding to the first clock request signal. The block clock management unit may be configured to receive the first clock request signal from each of the plurality of clock consumers, generate a second clock request signal corresponding to the first clock request signal, and receive a clock response signal and a second clock signal corresponding to the second clock request signal. The top clock management unit may be configured to receive the second clock request signal from the block clock management unit, generate the clock response signal and the second clock signal corresponding to the second clock request signal, and transmit the clock response signal and the second clock signal to the block clock management unit. The block clock management unit may be configured to generate the first clock signal corresponding to the first clock request signal, based on the second clock signal, and transmit the first clock signal to each of the plurality of clock consumers. The block clock management unit may be configured to generate the second clock request signal in response to receiving the first clock request signal from at least one clock consumer among the plurality of clock consumers, and stop generating the second clock request signal in response to transmission of the first clock request signal from all of the plurality of clock consumers being stopped.

According to some example embodiments of the inventive concepts, an operating method of an image sensor including a clock consumer, a block clock management unit, and a top clock management unit, may include generating, by the clock consumer, a first clock request signal, transmitting, by the clock consumer, the first clock request signal to the block clock management unit, generating, by the block clock management unit, a second clock request signal corresponding to the first clock request signal, transmitting, by the block clock management unit, the second clock request signal to the top clock management unit, generating, by the top clock management unit, a clock response signal and a second clock signal corresponding to the second clock request signal, transmitting, by the top clock management unit, the clock response signal and the second clock signal to the block clock management unit, transmitting, by the block clock management unit, a first clock signal corresponding to the first clock request signal to the clock consumer based on the second clock signal, and stopping, by the block clock management unit, transmission of the first clock signal to the clock consumer in response to transmission of the first clock request signal by the clock consumer being stopped.

BRIEF DESCRIPTION OF THE DRAWINGS

Example embodiments will be more clearly understood from the following detailed description taken in conjunction with the accompanying drawings in which:

FIGS. 5A and 5B are timing diagrams illustrating the operation of a block of an image signal processor, and transmission/reception signals, according to some example embodiments;

DETAILED DESCRIPTION OF THE EMBODIMENTS

Figure 1:
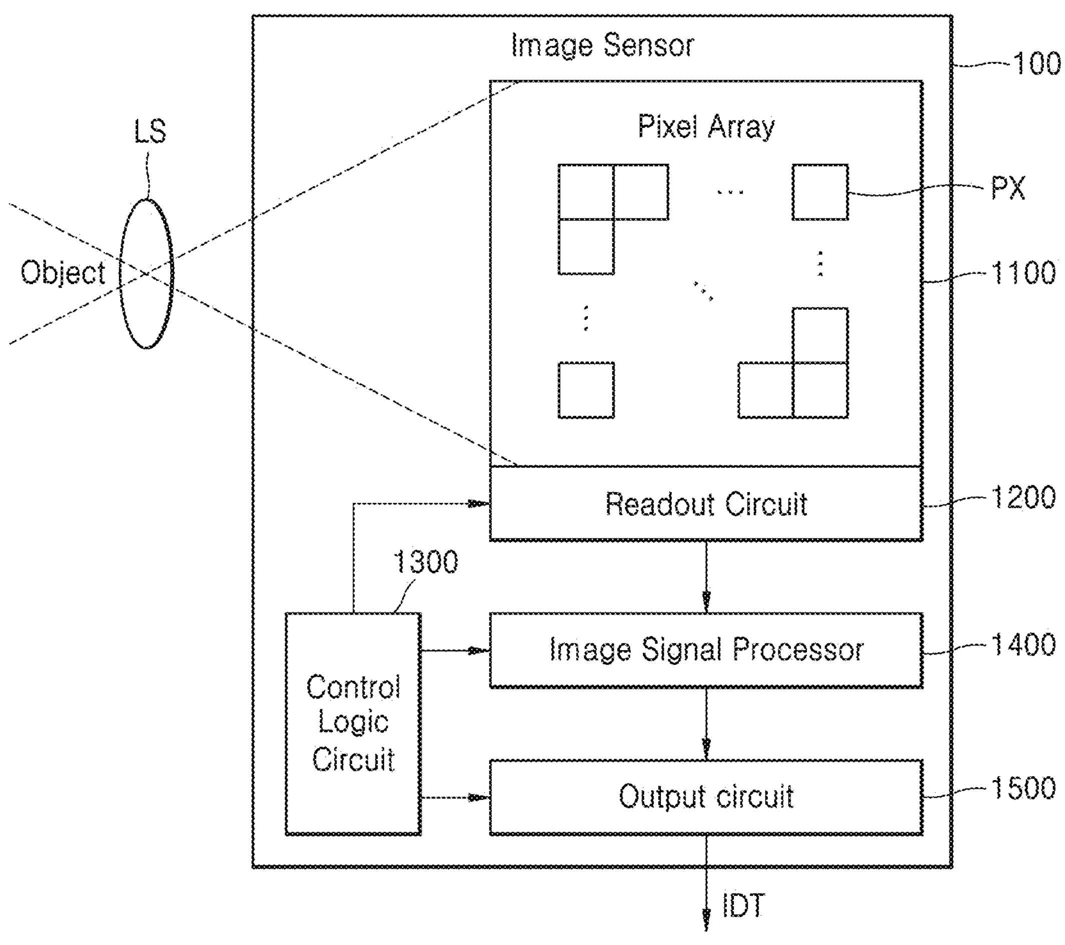
FIG. 1 is a block diagram illustrating an image sensor according to some example embodiments.

Hereinafter, some example embodiments are described in detail with reference to the accompanying drawings.

It will be understood that elements and/or properties thereof may be recited herein as being "identical", "the same", or "equal" as other elements and/or properties thereof, and it will be further understood that elements and/or properties thereof recited herein as being "identical" to, "the same" as, or "equal" to other elements and/or properties thereof may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to, equal to or substantially equal to, and/or the same or substantially the same as other elements and/or properties thereof may be structurally the same or substantially the same, functionally the same or substantially the same, and/or compositionally the same or substantially the same. While the term "same," "equal" or "identical" may be used in description of some example embodiments, it should be understood that some imprecisions may exist. Thus, when one element or property is referred to as being identical to, equal to, or the same as another element or property, it should be understood that the element or property is the same as another element or property within a desired manufacturing or operational tolerance range (e.g., ±10%).

It will be understood that elements and/or properties thereof described herein as being "substantially" the same, equal, and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value includes a manufacturing or operational tolerance (e.g., ±10%) around the stated numerical value. Moreover, when the words "about" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes. When ranges are specified, the range includes all values therebetween such as increments of 0.1%.

As described herein, when an operation is described to be performed, or an effect such as a structure is described to be established "by" or "through" performing additional operations, it will be understood that the operation may be performed and/or the effect/structure may be established "based on" the additional operations, which may include performing said additional operations alone or in combination with other further additional operations.

FIG. 1 is a block diagram illustrating an image sensor 100 according to some example embodiments.

The image sensor 100 may convert an optical signal of an object (Object) incident through an optical lens LS into image data. The image sensor 100 may be mounted on an electronic device having an image or light sensing function. For example, the image sensor 100 may be mounted on electronic devices, such as a digital still camera, a digital video camera, a smartphone, a wearable device, an Internet of Things (IoT) device, a tablet personal computer (PC), a personal digital assistant (PDA), a portable multimedia player (PMP), a navigation device, etc. In addition, the image sensor 100 may be mounted on electronic devices provided as components in vehicles, furniture, manufacturing equipment, doors, various measuring devices, etc.

Referring to FIG. 1, the image sensor 100 may include a pixel array 1100, a readout circuit 1200, a control logic circuit 1300, an image signal processor 1400, and an output circuit 1500.

The pixel array 1100 may be implemented as a photoelectric conversion device, such as a charge coupled device (CCD) or a complementary metal oxide semiconductor (CMOS), and may also be implemented as various types of photoelectric conversion devices. The pixel array 1100 may include a plurality of sensing pixels PX that convert a received optical signal (light) into an electrical signal, and the sensing pixels PX may be arranged in rows and columns. Each of the sensing pixels PX may include a light sensing device. For example, the light sensing device may include a photodiode, an organic photodiode, a phototransistor, a photogate, or a pinned photodiode.

The readout circuit 1200 may receive electrical signals from the pixel array 1100 and convert the received electrical signals into image data. The readout circuit 1200 may amplify electrical signals and perform analog-to-digital conversion on the amplified electrical signals. Image data generated by the readout circuit 1200 may include a plurality of pixels corresponding to a plurality of sensing pixels PX of the pixel array 1100. Here, the sensing pixel PX of the pixel array 1100 may be a physical structure that generates a signal according to received light, and the pixel provided in the image data may represent data corresponding to the sensing pixel PX. The readout circuit 1200 may form a sensing core together with the pixel array 1100.

The control logic circuit 1300 may control the overall operation of the image sensor 100. In some example embodiments, the control logic circuit 1300 may control the readout circuit 1200, the image signal processor 1400, and the output circuit 1500 to generate image data IDT.

The image signal processor 1400 may perform image processing on image data output from the readout circuit 1200. For example, the image signal processor 1400 may perform image processing, such as bad pixel correction, remosaic, and noise removal on the image data.

The output circuit 1500 may communicate with an external processor based on one of various high-speed interface methods. For example, the output circuit 1500 may communicate with an external processor based on the mobile industry processor interface (MIPI) method. The output circuit 1500 may convert the image data output from the image signal processor 1400 into the image data IDT having a data format according to a set interface method and may transmit the image data IDT to an external processor. The external processor may include a main processor, an application processor, or a graphics processor of an electronic device in which the image sensor 100 is mounted.

The control logic circuit 1300, the image signal processor 1400, and the output circuit 1500 may be implemented as digital circuits, and a clock signal may be provided to each of the digital circuits. When each digital circuit transmits a clock request signal to a clock management unit (e.g., in response to such transmission), the clock management unit may provide (e.g., transmit) a clock signal corresponding to the clock request signal to each digital circuit. Accordingly, the digital circuits may be provided with the clock signal independently in response to a clock request signal, and the clock management unit may refrain from providing clock signals (e.g., may block clock signals from being provided) to one or more digital circuits in the absence of a clock request signal being transmitted from the one or more digital circuits. In some example embodiments, the digital circuits may be provided with the clock signal independently only when they need to operate (e.g., a clock signal may be provided to a digital circuit only in response to a clock request signal being transmitted from the digital circuit). As a result, unnecessary power consumption by the image sensor 100 may be reduced or minimized (e.g., the power consumption efficiency of the image sensor 100 may be improved) without compromising operational performance of the image sensor 100 (e.g., without degradation in image processing operations performed by the image sensor 100, with reduced, minimized, or prevented data loss in such image processing operations, etc.). Thus, the functionality of the image sensor 100 may be improved.

Figure 2:
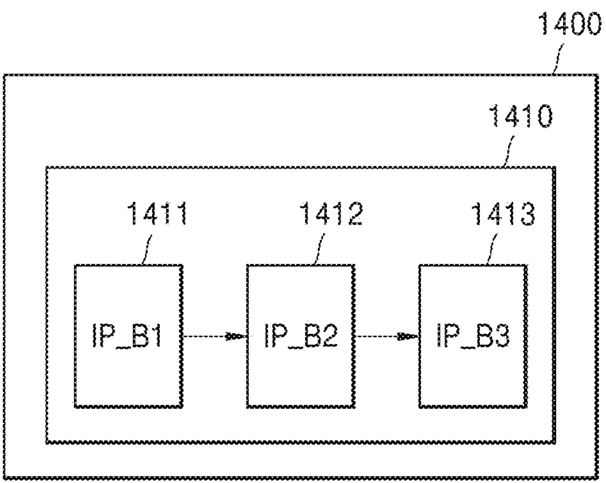
FIG. 2 is a block diagram illustrating an image signal processor according to some example embodiments.

FIG. 2 is a block diagram illustrating the image signal processor 1400 according to some example embodiments.

Referring to FIG. 2, the image signal processor 1400 may include a plurality of intellectual property (IP) blocks 1410. In FIG. 2, the IP blocks 1410 are illustrated as including first to third IP blocks 1411, 1412, and 1413, but are not limited thereto, and the IP blocks 1410 may include two or more IP blocks.

Each of the IP blocks 1410, i.e., the first to third IP blocks 1411, 1412, and 1413, may perform image processing set as a functional block for image processing, and the first to third IP blocks 1411, 1412, and 1413 may perform different image processing (e.g., different image processing operations). In some example embodiments, the first IP block 1411 may correct bad pixels of image data, the second IP block 1412 may perform remosaic, and the third IP block 1413 may remove noise. The first to third IP blocks 1411, 1412, and 1413 may sequentially perform image processing on image frames, but are not limited thereto. The IP blocks 1410 may use a clock signal (e.g., may operate based on using a received clock signal) to perform image processing. Each of the IP blocks 1410 may be referred to herein as a clock consumer.

In the above, the IP blocks 1410 included in the image signal processor 1400 have been described as an example, but each of IP blocks included in digital circuits, such as the control logic circuit 1300 and the output circuit 1500, may also be clock consumers.

Figure 3:
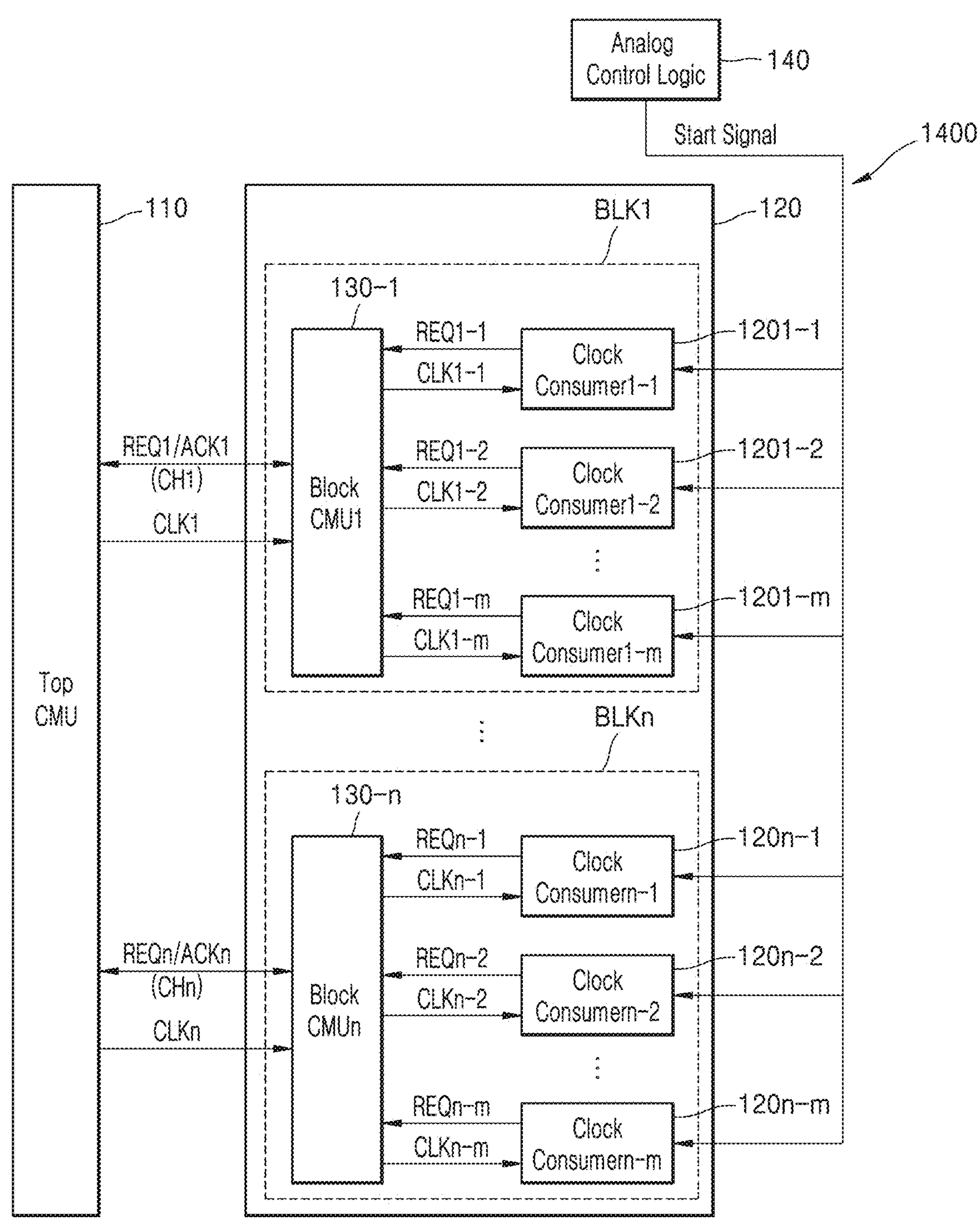
FIG. 3 is a block diagram illustrating an image signal processor according to some example embodiments.

FIG. 3 is a block diagram illustrating the image signal processor 1400 according to some example embodiments. FIG. 3 shows clock architecture of the image signal processor 1400.

Referring to FIG. 3, the image signal processor 1400 may include a top clock management unit (or a top CMU) 110, a plurality of blocks 120, and an analog control logic 140.

The clock consumers included in each of the blocks 120 of FIG. 3 may correspond to the IP blocks 1410 of FIG. 2, and the following clock signal management may correspond to clock signal management provided to the IP blocks 1410 of FIG. 2.

One top clock management unit 110 may provide n clock signals CLK1 to CLKn to n blocks BLK1 to BLKn through n channels CH1 to CHn. n may be 1 or greater. In FIG. 3, n may be any positive integer.

n channels CH1 to CHn may be formed through transmission and reception of n clock request signals REQ1 to REQn and n clock response signals ACK1 to ACKn corresponding to each other. n clock request signals REQ1 to REQn may be transmitted from n blocks BLK1 to BLKn to the top clock management unit 110, and n clock response signals ACK1 to ACKn may be transmitted from the top clock management unit 110 to n blocks BLK1 to BLKn. The top clock management unit 110 may simultaneously provide n clock response signals ACK1 to ACKn and n clock signals CLK1 to CLKn to n blocks BLK1 to BLKn.

A time at which the top clock management unit 110 starts or stops providing n clock signals CLK1 to CLKn to n blocks BLK1 to BLKn may be a time at which the top clock management unit 110 starts or stops receiving n clock request signals REQ1 to REQn from n blocks BLK1 to BLKn. n blocks BLK1 to BLKn may independently start or stop transmission of n clock request signals REQ1 to REQn and start or stop reception of n clock response signals ACK1 to ACKn and n clock signals CLK1 to CLKn, respectively.

A time at which n blocks BLK1 to BLKn start transmitting n clock request signals REQ1 to REQn to the top clock management unit 110 may be the same. Accordingly, the time at which the top clock management unit 110 starts providing n clock response signals ACK1 to ACKn and n clock signals CLK1 to CLKn for n blocks BLK1 to BLKn may be the same.

The time at which n blocks BLK1 to BLKn start transmitting n clock request signals REQ1 to REQn to the top clock management unit 110 may be different from each other. Accordingly, the time at which the top clock management unit 110 starts providing n clock response signals ACK1 to ACKn and n clock signals CLK1 to CLKn for n blocks BLK1 to BLKn may be different from each other.

The time at which n blocks BLK1 to BLKn stop transmitting n clock request signals REQ1 to REQn to the top clock management unit 110 may be the same. Accordingly, the time at which the top clock management unit 110 stops providing n clock response signals ACK1 to ACKn and n clock signals CLK1 to CLKn to n blocks BLK1 to BLKn may be the same.

The time at which n blocks BLK1 to BLKn stop transmitting n clock request signals REQ1 to REQn to the top clock management unit 110 may be different from each other. Accordingly, the time at which the top clock management unit 110 stops providing n clock response signals ACK1 to ACKn and n clock signals CLK1 to CLKn to n blocks BLK1 to BLKn may be different from each other.

Each of n blocks BLK1 to BLKn may include a block clock management unit and a plurality of clock consumers. The number (quantity) of the clock consumers included in n blocks BLK1 to BLKn may be the same or different. For example, a first block BLK1 may include a first block clock management unit 130-1 and m clock consumers 1201-1 to **1201-*m***. For n blocks BLK1 to BLKn below, the configuration and operation identical to those of the first block BLK1 are omitted or briefly described, and the other configurations and operations are described in more detail.

A first block clock management unit 130-1 may provide m clock signals CLK1-1 to CLK1-*m* to m clock consumers 1201-1 to **1201-*m*. m may be 1 or greater. In some example embodiments, m may be any positive integer. The first block clock management unit 130-1** may receive m clock request signals REQ1-1 to REQ1-*m* from m clock consumers 1201-1 to **1201-*m*** and may transmit m clock signals CLK1-1 to CLK1-*m* corresponding to m clock request signals REQ1-1 to REQ1-*m* to m clock consumers 1201-1 to **1201-*m*. The first block clock management unit 130-1** may provide m clock signals CLK1-1 to CLK1-*m* in response to m clock request signals REQ1-1 to REQ1-*m* without m clock response signals, i.e., without a channel. That is, the first block clock management unit 130-1 may provide m clock signals CLK1-1 to CLK1-*m* according to a method other than a handshake method.

A time at which m clock consumers 1201-1 to **1201-*m*** start or stop receiving m clock signals CLK1-1 to CLK1-*m* from the first block clock management unit 130-1 may be a time at which m clock consumers 1201-1 to **1201-*m*** start or stop transmitting m clock request signals REQ1-1 to REQ1-*m* to the first block clock management unit 130-1.

The time at which m clock consumers 1201-1 to **1201-*m*** start transmitting m clock request signals REQ1-1 to REQ1-*m* to the first block clock management unit 130-1 may be the same. Accordingly, the time at which the first block clock management unit 130-1 starts providing m clock signals CLK1-1 to CLK1-*m* to m clock consumers 1201-1 to **1201-*m*** may be the same.

The time at which m clock consumers 1201-1 to **1201-*m*** start transmitting m clock request signals REQ1-1 to REQ1-*m* to the first block clock management unit 130-1 may be different from each other. Accordingly, the time at which the first block clock management unit 130-1 starts providing m clock signals CLK1-1 to CLK1-*m* to m clock consumers 1201-1 to **1201-*m*** may be different from each other.

The time at which m clock consumers 1201-1 to **1201-*m*** stop transmitting m clock request signals REQ1-1 to REQ1-*m* to the first block clock management unit 130-1 may be the same. Accordingly, the time at which the first block clock management unit 130-1 stops providing m clock signals CLK1-1 to CLK1-*m* to m clock consumers 1201-1 to **1201-*m*** may be the same.

The time at which m clock consumers 1201-1 to **1201-*m*** stop transmitting m clock request signals REQ1-1 to REQ1-*m* to the first block clock management unit 130-1 may be different from each other. Accordingly, the time at which the first block clock management unit 130-1 stops providing m clock signals CLK1-1 to CLK1-*m* to m clock consumers 1201-1 to **1201-*m*** may be different from each other.

Because the image sensor (100 in FIG. 1) may have the characteristics that image data may be processed on a frame-by-frame basis, may be transmitted only in one direction, and has a limited application of a function to stop processing, the image sensor 100 may be configured to reduce or prevent consequent image data loss. According to some example embodiments, the top clock management unit 110 may stably supply a clock signal to the block clock management unit through a channel formed by a handshake method and the block clock management unit may immediately supply a clock signal to the clock consumer in response to a clock request signal of (e.g., transmitted from) a clock consumer, thereby reducing or minimizing latency of clock supply to the clock consumer and reducing, minimizing, or preventing data loss.

Figure 14:
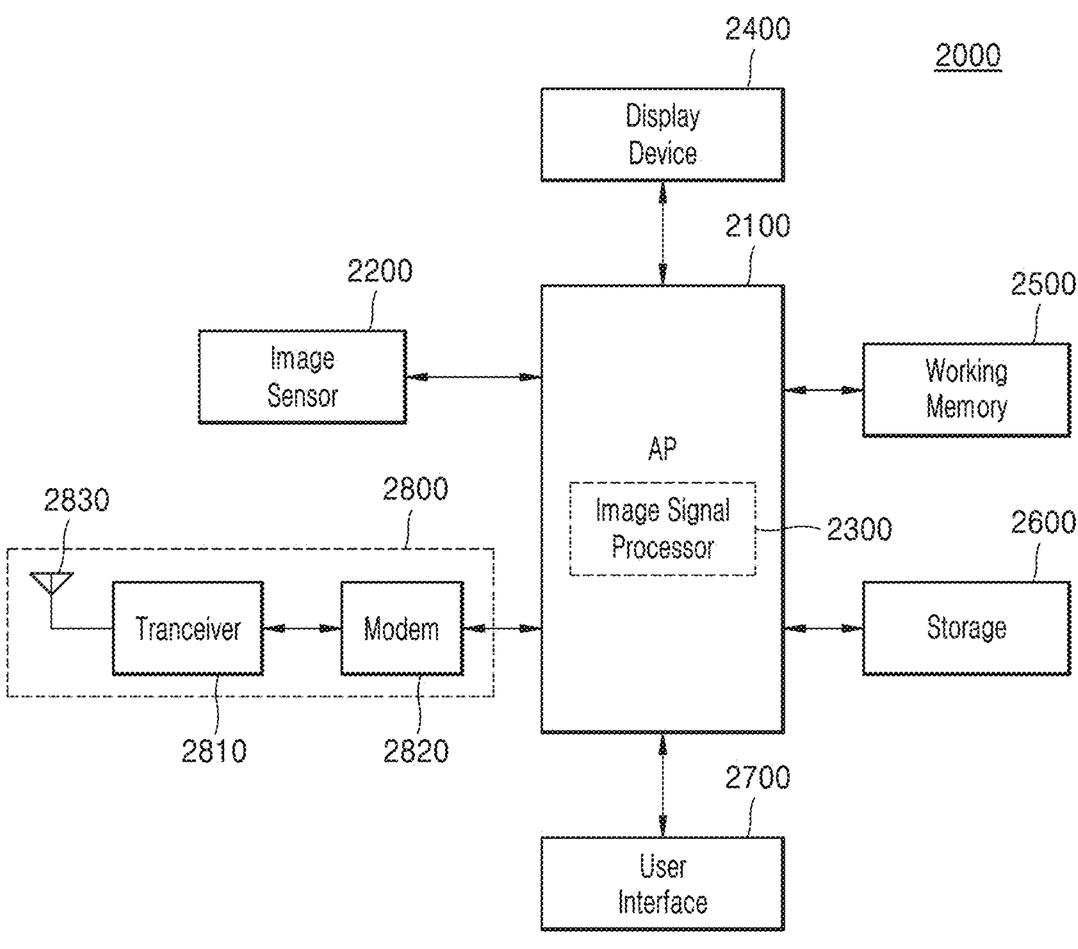
FIG. 14 is a block diagram illustrating an image sensor according to some example embodiments.

The analog control logic 140 (which may be included in the image sensor 100, for example as part of the control logic circuit 1300 and/or a device implementing same, which may be included in the image processing device 2000 shown in FIG. 14, for example as part of an application processor (AP) or a device implementing same, any combination thereof, or the like) may transmit a start signal to each of the clock consumers. The start signal may be a signal indicating an end time of a vertical blank period of the image frame. In other words, the start signal may be a signal indicating a start time of an active period of the image frame. The vertical blank period may refer to a period between a time at which the operations of all of the clock consumers in a current image frame end to a time at which a start signal is generated in a next image frame.

Each of the clock consumers may generate a clock request signal in response to a start signal received from the analog control logic 140, but example embodiments are not limited thereto.

Hereinafter, the operation of blocks of the image signal processor 1400 according to some example embodiments is described in detail with reference to FIGS. 4 and 5.

Figure 4:
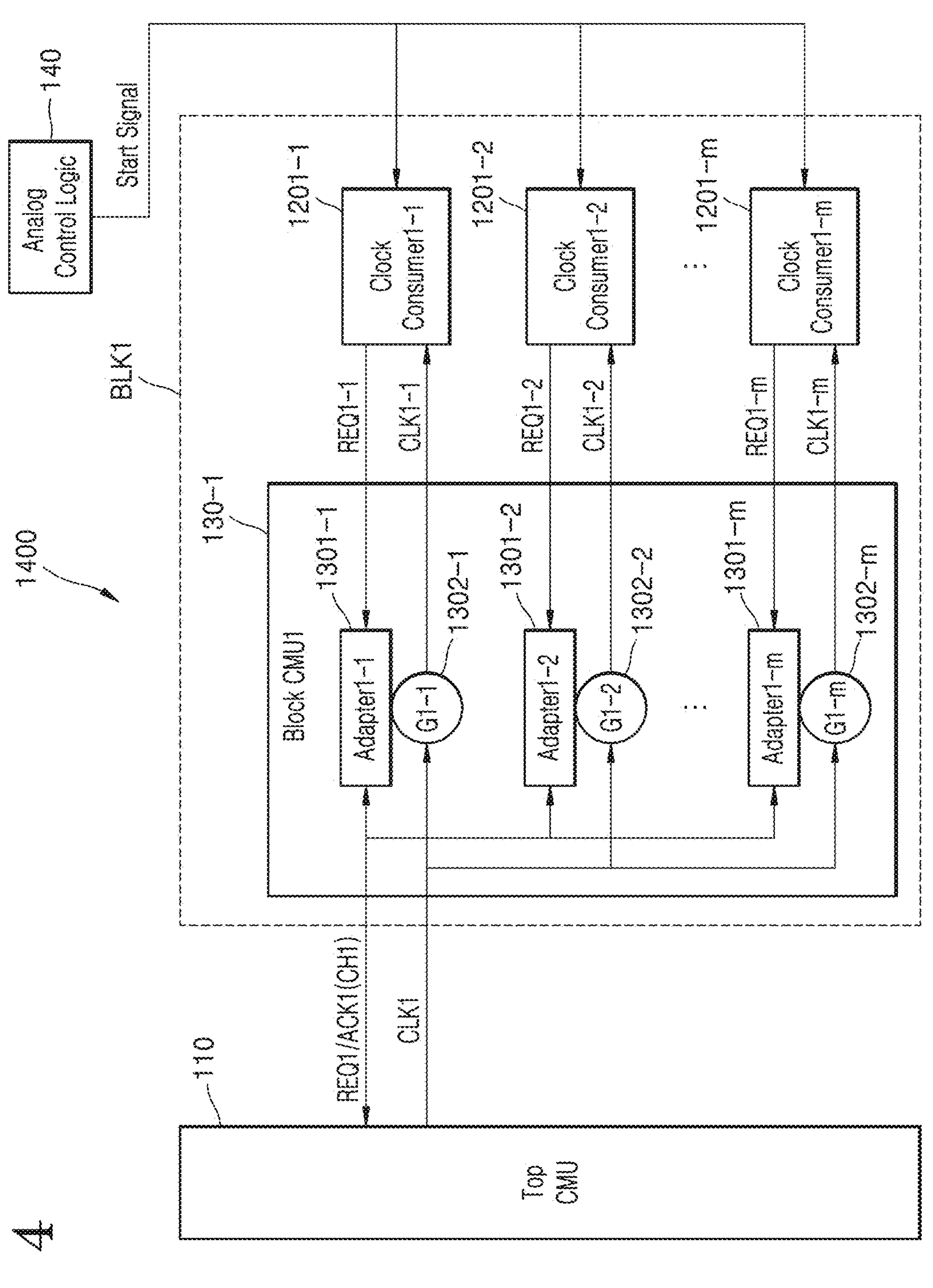
FIG. 4 is a block diagram illustrating a block of an image signal processor according to some example embodiments.

FIG. 4 is a block diagram illustrating a block of the image signal processor 1400 according to some example embodiments.

Figure 5A:
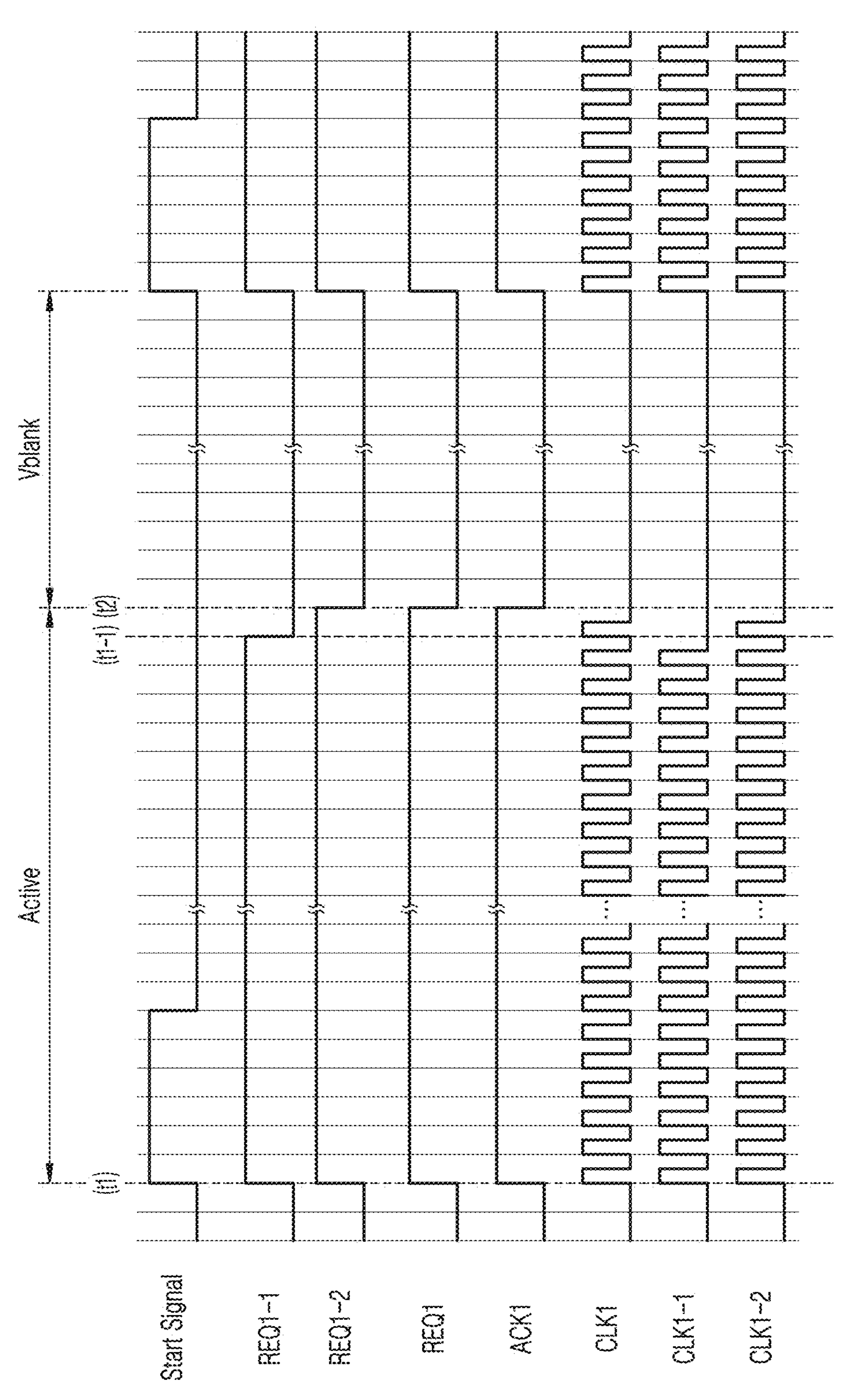
Figure 5B:
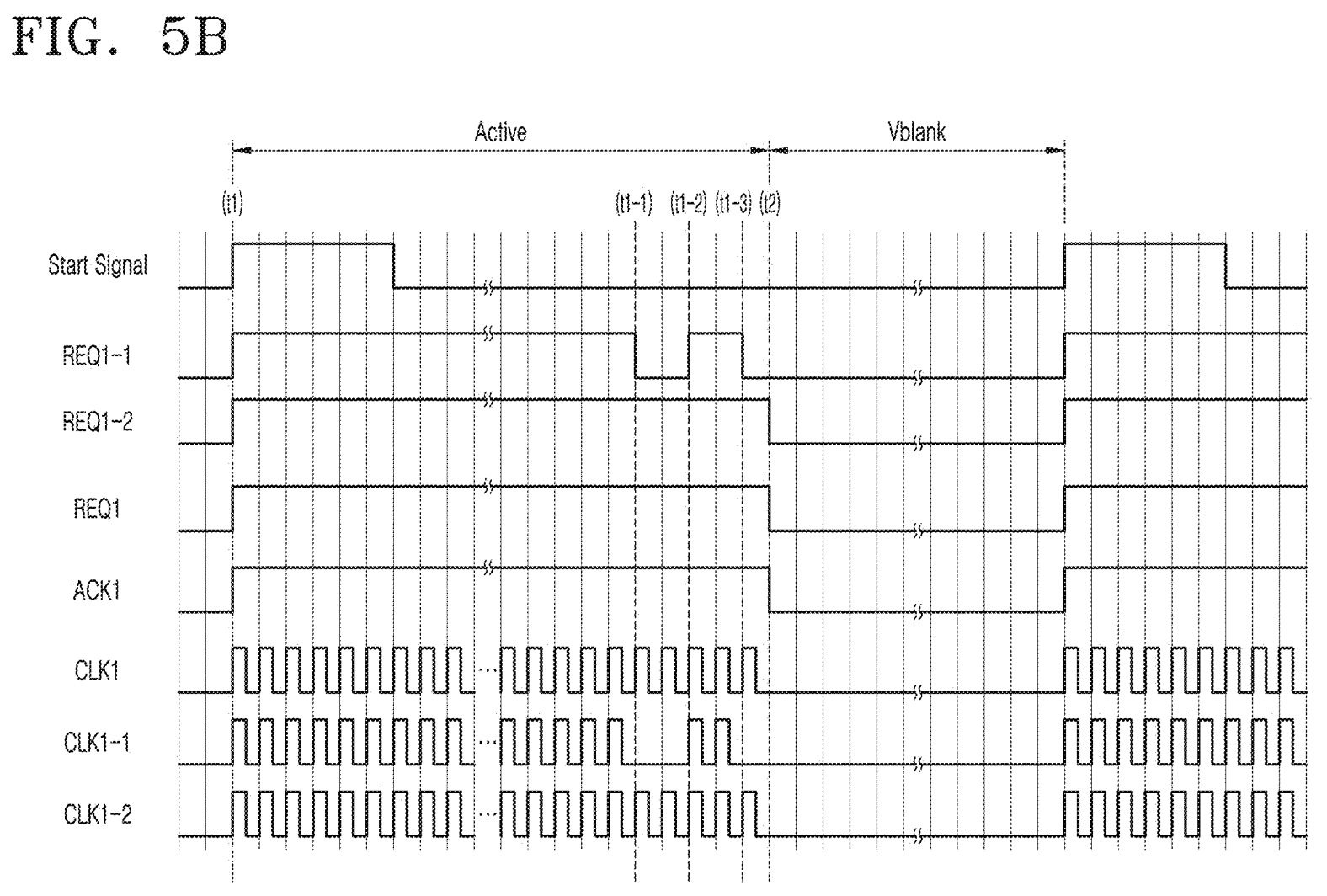

FIGS. 5A and 5B are timing diagrams illustrating an operation of a block of the image signal processor 1400 and transmission/reception signals according to some example embodiments.

Referring to FIGS. 4 and 5A, a 1-1 clock consumer 1201-1 may generate a 1-1 clock request signal REQ1-1 and transmit the generated 1-1 clock request signal REQ1-1 to the first block clock management unit 130-1 and may receive a 1-1 clock signal CLK1-1 corresponding to the 1-1 clock request signal REQ1-1 from the first block clock management unit 130-1.

The 1-1 clock consumer 1201-1 may generate the 1-1 clock request signal REQ1-1 in response to a start signal received from the analog control logic 140. That is, the 1-1 clock consumer 1201-1 may generate the 1-1 clock request signal REQ1-1 at a time at which the vertical blank period Vblank of the image frame ends. For example, the 1-1 clock consumer 1201-1 may generate the 1-1 clock request signal REQ1-1 at a first time t1 at which the start signal is received (e.g., in response to receiving the start signal).

The first block clock management unit 130-1 may generate a second clock request signal REQ1 corresponding to the 1-1 clock request signal REQ1-1 and transmit the generated second clock request signal REQ1 to the top clock management unit 110 and may receive a clock response signal ACK1 and a second clock signal CLK1 corresponding to the second clock request signal REQ1 from the top clock management unit 110.

The first block clock management unit 130-1 may generate the second clock request signal REQ1 at the time of receiving (e.g., in response to receiving) any one (e.g., at least one) of m clock request signals REQ1-1 to REQ**1-*m*. For example, the first block clock management unit 130-1 may generate the second clock request signal REQ1 at first time t1 at which the 1-1 clock request signal REQ1-1 is received (e.g., in response to receiving the 1-1 clock request signal REQ1-1**).

The top clock management unit 110 may generate a clock response signal ACK1 and a second clock signal CLK1 corresponding to the second clock request signal REQ1 received from the first block clock management unit 130-1 (e.g., the top clock management unit 110 may generate the clock response signal ACK1 and the second clock signal CLK1 in response to receiving the second clock request signal REQ1) and the top clock management unit 110 may transmit the generated clock response signal ACK1 and second clock signal CLK1 to the first block clock management unit 130-1.

For example, the top clock management unit 110 may generate the clock response signal ACK1 and the second clock signal CLK1 at first time t1 at which the second clock request signal REQ1 is received (e.g., in response to receiving the second clock request signal REQ1), the clock response signal ACK1 may maintain a high level during a period from first time t1 to second time t2 for which the second clock request signal REQ1 maintains a high level, and the second clock signal CLK1 may toggle during a period from first time t1 to second time t2 for which the second clock request signal REQ1 maintains a high level.

The first block clock management unit 130-1 may transmit a 1-1 clock signal CLK1-1 corresponding to a 1-1 clock request signal REQ1-1 based on the second clock signal CLK1 received from the top clock management unit 110 (e.g., in response to receiving the second clock signal CLK1).

The first block clock management unit 130-1 may include a plurality of adapters 1301-1 to **1301-*m* and a plurality of clock gate units 1302-1 to 1302-*m*. The 1-1 adapter 1301-1 may control the 1-1 clock gate unit 1302-1. The 1-1 clock gate unit 1302-1 may transmit the 1-1 clock signal CLK1-1**.

The 1-1 clock gate unit 1302-1 is a unit that performs clock gating and may be provided within the first block clock management unit 130-1. The 1-1 clock gate unit 1302-1 may be implemented in various ways and may include logic elements, such as flip-flops and AND gates, for example. The 1-1 clock gate unit 1302-1 may transmit the 1-1 clock signal CLK1-1 or block transmission of the 1-1 clock signal CLK1-1 under control by the 1-1 adapter 1301-1.

When the 1-1 clock request signal REQ1-1 is transmitted from the 1-1 clock consumer 1201-1 (e.g., in response to the 1-1 clock request signal REQ1-1 being transmitted from the 1-1 clock consumer 1201-1, and thus received at the 1-1 adapter 1301), the 1-1 adapter 1301-1 may control the 1-1 clock gate unit 1302-1 to transmit the 1-1 clock signal CLK1-1, and when the 1-1 clock request signal REQ1-1 is stopped from being transmitted from the 1-1 clock consumer 1201-1 (e.g., in response to transmission of the 1-1 clock request signal REQ1-1 from the 1-1 clock consumer 120-1 being stopped), the 1-1 adapter 1301-1 may control the 1-1 clock gate unit 1302-1 to block transmission of the 1-1 clock signal CLK1-1.

For example, when the 1-1 adapter 1301-1 receives the 1-1 clock request signal REQ1-1 (e.g., in response to said receipt), the 1-1 adapter 1301-1 may generate the second clock request signal REQ1 corresponding to the 1-1 clock request signal REQ1-1 and transmit the generated second clock request signal REQ1 to the top clock management unit 110 and control the 1-1 clock gate unit 1302-1 to transmit the second clock signal CLK1 as the 1-1 clock signal CLK1-1 to the 1-1 clock consumer 1201-1. When receiving of the 1-1 clock request signal REQ1-1 is stopped (e.g., in response to transmission of the 1-1 clock request signal REQ1-1 from the 1-1 clock consumer 120-1 being stopped), the 1-1 adapter 1301-1 may control the 1-1 clock gate unit 1302-1 to block transmission of the 1-1 clock signal CLK1-1 to the 1-1 clock consumer 1201-1. That is, the first block clock management unit 130-1 may transmit the 1-1 clock signal CLK1-1 corresponding to the 1-1 clock request signal REQ1-1 to the 1-1 clock consumer 1201-1 during a period from first time t1 at which reception of the 1-1 clock request signal REQ1-1 starts to 1-1 time t1-1 at which reception of the 1-1 clock request signal REQ1-1 stops.

Meanwhile, during the period from first time t1 at which reception of the 1-2 clock request signal REQ1-2 starts to second time t2 at which reception of the 1-2 clock request signal REQ1-2 stops, the first block clock management unit 130-1 may transmit the 1-2 clock signal CLK1-2 corresponding to the 1-2 clock request signal REQ1-2 to the 1-2 clock consumer 1201-2.

The first block clock management unit 130-1 may stop generating the second clock request signal REQ1 at a time at which reception of all m clock request signals REQ1-1 to REQ**1-*m* is stopped (e.g., in response to transmission of all m clock request signals REQ1-1 to REQ1-*m* being stopped). For example, if 1-1 time t1-1 at which the 1-1 clock consumer 1201-1 stops generating the 1-1 clock request signal REQ1-1 and second time t2 at which the 1-2 clock consumer 1201-2 stops generating the 1-2 clock request signal REQ1-2 are different, the first block clock management unit 130-1 may stop generating the second clock request signal REQ1 at second time t2 that is later and the top clock management unit 110 may stop transmitting the clock response signal ACK1 and the second clock signal CLK1 at second time t2**.

According to some example embodiments, a clock (e.g., clock signal) may be selectively supplied to a clock consumer for a limited period during which the clock is used to perform image processing (e.g., in response to a clock request signal being transmitted by the clock consumer) and may be blocked from being supplied (e.g., provided, transmitted, etc.) to the clock consumer during periods during which the clock consumer is not performing an image processing operation that utilizes a clock signal (e.g., in response to clock request signal transmission from the clock consumer being stopped). For example, the clock may be selectively supplied to a clock consumer only for a period during which the clock is used by the clock consumer to perform image processing for each of a plurality of IP blocks included in an image sensor 100 (as may be indicated by the transmission of the clock request signal from the clock consumer), so that power (e.g., power consumption by the image sensor 100) due to unnecessary clock supply (e.g., supplying a clock during a period where the clock is not used by the clock consumer to perform image processing) may be reduced or minimized. As a result, power consumption by the image sensor 100 may be reduced or minimized without compromising image processing performance by the image sensor 100 (e.g., without degradation in image processing operations performed by the image sensor 100, with reduced, minimized, or prevented data loss in such image processing operations, etc.). Thus, the functionality of the image sensor 100 may be improved.

Referring to FIGS. 4 and 5B, for example, when the 1-1 clock consumer 1201-1 and the 1-2 clock consumer 1201-2 generate the 1-1 clock request signal REQ1-1 and the 1-2 clock request signal REQ1-2, respectively, at first time t1 and transmit them to the first block clock management unit 130-1, the first block clock management unit 130-1 may, in response, generate the second clock request signal REQ1 at first time t1 at which at least one of the 1-1 clock request signal REQ1-1 or the 1-2 clock request signal REQ1-2 was received and transmit the second clock request signal REQ1 to the top clock management unit 110.

The first block clock management unit 130-1 may generate and transmit the second clock request signal REQ1 during a period, for example, from first time t1 to second time t2, while receiving (e.g., based on receiving) at least one of the 1-1 clock request signal REQ1-1 or the 1-2 clock request signal REQ1-2.

The top clock management unit 110 may generate the clock response signal ACK1 (e.g., in response to the transmission of the second clock request signal REQ1) during period from first time t1 to second time t2 and transmit the generated clock response signal ACK1 to the first block clock management unit 130-1, and a first channel CH1 may be formed during the period from first time t1 to second time t2. During the period from first time t1 to second time t2 in which the first channel CH1 is formed, the top clock management unit 110 may generate the second clock signal CLK1 and transmit the second clock signal CLK1 to the first block clock management unit 130-1.

The 1-1 clock consumer 1201-1 may generate the 1-1 clock request signal REQ1-1 and transmit the same to the first block clock management unit 130-1 during first time t1 to 1-1 time t1-1, stop generating (and thus stop transmitting) the 1-1 clock request signal REQ1-1 during the period from 1-1 time t1-1 to 1-2 time t1-2, generate the 1-1 clock request signal REQ1-1 and transmit the same to the first block clock management unit 130-1 during 1-2 time t1-2 to 1-3 time t1-3, and stop generating (and thus stop transmitting) the 1-1 clock request signal REQ1-1 at 1-3 time t1-3. In response thereto, the 1-1 clock consumer 1201-1 may receive the 1-1 clock signal CLK1-1 during the period from first time t1 to 1-1 time t1-1, stop receiving the 1-1 clock signal CLK1-1 during the period from 1-1 time t1-1 to 1-2 time t1-2, receive the 1-1 clock signal CLK1-1 during the period from 1-2 time t1-2 to 1-3 time t1-3, and stop receiving the 1-1 clock signal CLK1-1 at 1-3 time t1-3.

Here, because the first block clock management unit 130-1 receives the second clock signal CLK1 from the top clock management unit 110 through the first channel CH1 during the period from first time t1 to second time t2, the 1-1 clock signal CLK1-1 corresponding to the 1-1 clock request signal REQ1-1 may be provided based on the second clock signal CLK1 immediately at 1-2 time t1-2 at which reception of the 1-1 clock request signal REQ1-1 restarts after 1-1 time t1-1 at which reception of the 1-1 clock request signal REQ1-1 was stopped, and thus, latency of clock supply for the 1-1 clock consumer 1201-1 may be reduced or minimized, thereby reducing, minimizing, or preventing reduction in image processing performance of the image sensor 100 while enabling selective transmission of clock signals to the 1-1 clock consumer 1201-1 to reduce power consumption by the image sensor 100 without compromising image processing operations thereby and thus improving functionality of the image sensor 100.

According to some example embodiments, clocks (e.g., clock signals) may be supplied (e.g., transmitted, provided, etc.) to the clock consumers included in the image sensor 100 with reduced or minimal latency, thereby performing clock control suitable for the image sensor 100.

Figure 6:
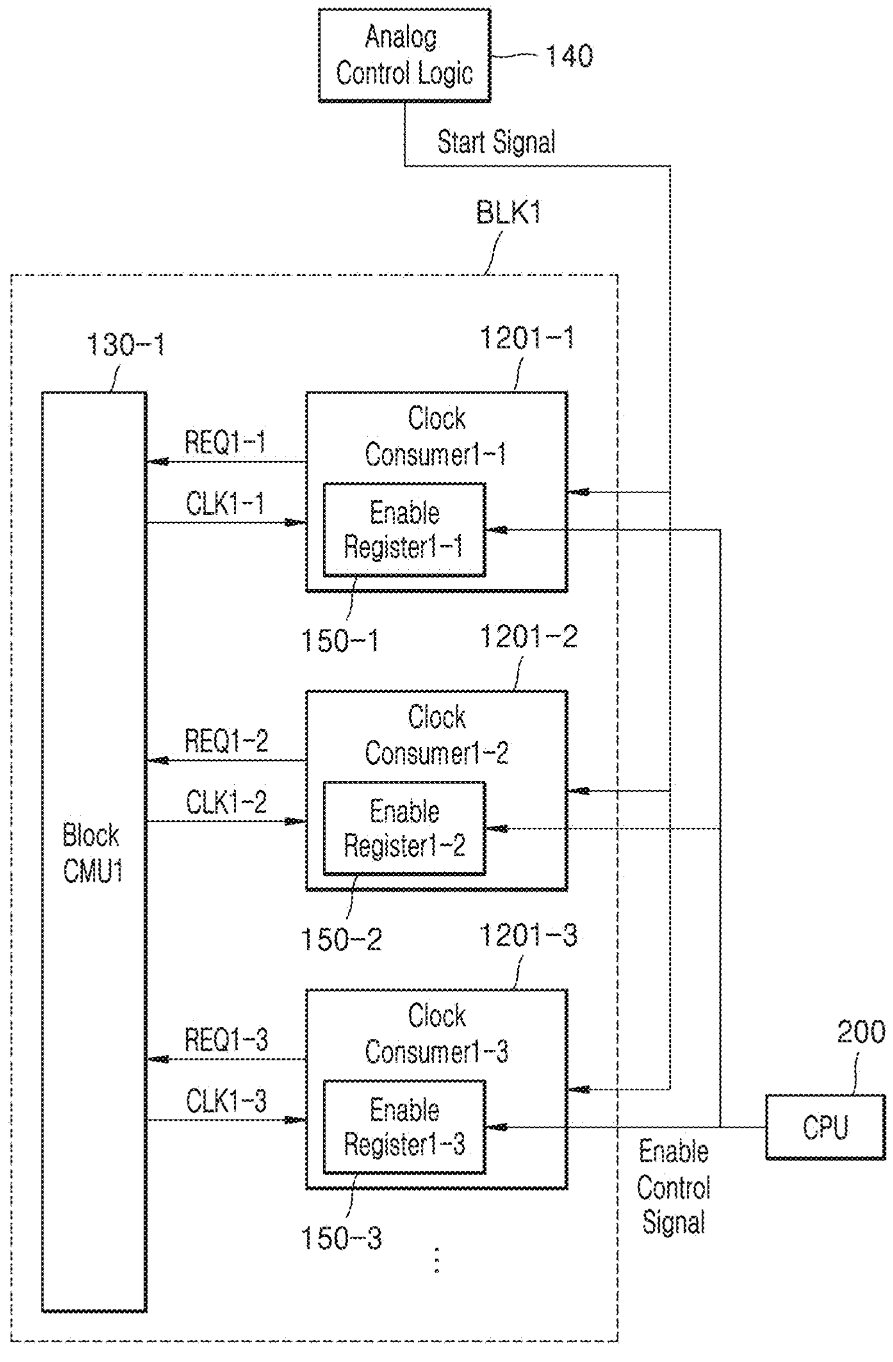
FIG. 6 is a block diagram illustrating a block of an image signal processor according to some example embodiments.

FIG. 6 is a block diagram illustrating a block of the image signal processor 1400 according to some example embodiments.

Figure 7A:
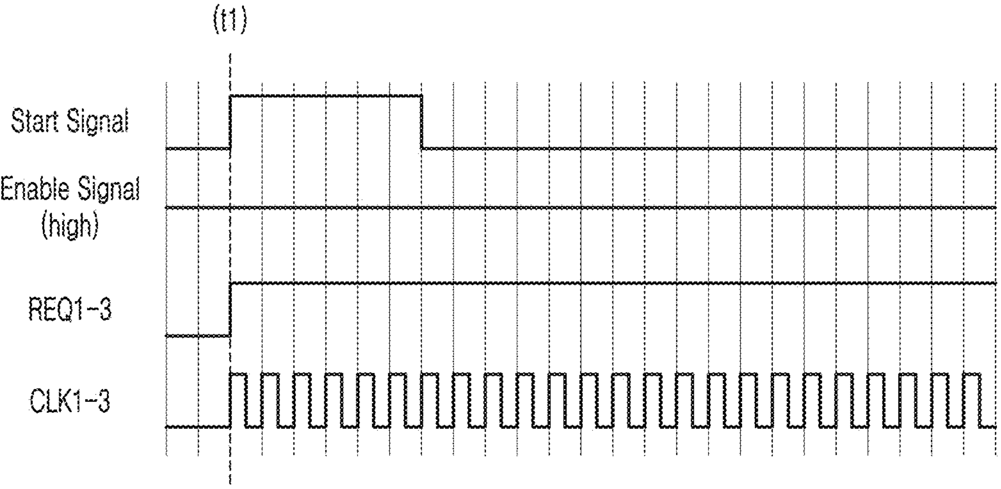
FIGS. 7A and 7B are timing diagrams illustrating signals according to the operation of a block of an image signal processor according to some example embodiments.
Figure 7B:
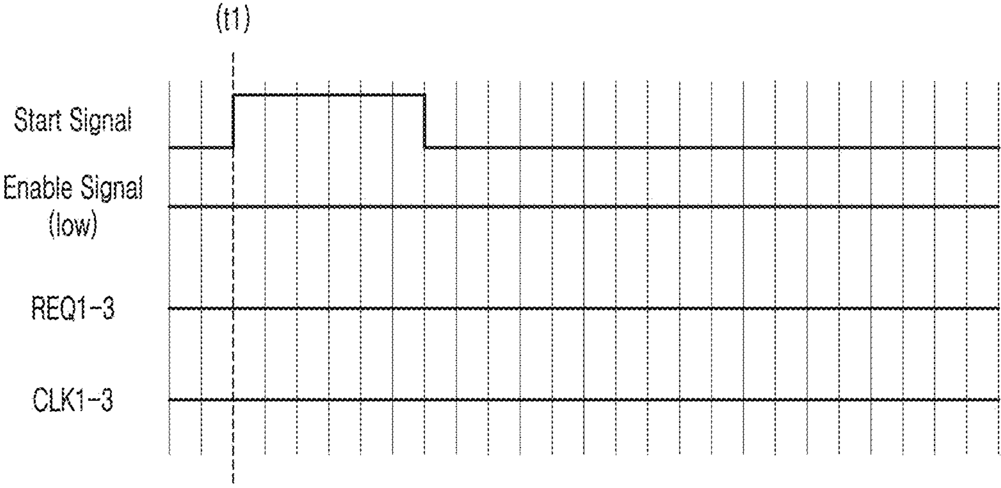

FIGS. 7A and 7B are timing diagrams illustrating signals according to an operation of a block of the image signal processor 1400 according to some example embodiments.

Referring to FIG. 6, a 1-3 clock consumer 1201-3 may generate a 1-3 clock request signal REQ1-3 based on a start signal transmitted from the analog control logic 140 and an enable signal generated by a 1-3 enable register 150-3.

The analog control logic 140 may transmit a start signal to a plurality of clock consumers. For example, the analog control logic 140 may transmit the start signal to the 1-1 clock consumer 1201-1, the 1-2 clock consumer 1201-2, and the 1-3 clock consumer 1201-3.

The 1-1 clock consumer 1201-1, the 1-2 clock consumer 1201-2, and the 1-3 clock consumer 1201-3 may include a 1-1 enable register 150-1, a 1-2 enable register 150-2, and a 1-3 enable register 150-3, respectively. The 1-1 enable register 150-1, the 1-2 enable register 150-2, and the 1-3 enable register 150-3 may each receive an enable control signal from an external CPU 200 (which may be included in the image sensor 100, for example as part of the control logic circuit 1300 and/or a device implementing same, which may be included in the image processing device 2000 shown in FIG. 14, for example as part of an application processor (AP) or a device implementing same, any combination thereof, or the like), etc. The enable control signal may be a signal that changes the enable signal of the enable register to an activation signal or a deactivation signal.

Referring to FIGS. 7A and 7B, the 1-3 clock consumer 1201-3 may generate the 1-1 clock request signal REQ1-1 in response to a start signal if the enable signal is an activation signal (e.g., in response to a determination that the enable signal is an activation signal concurrently with receiving the start signal), and may not respond to the start signal (e.g., may block generation and/or transmission of the 1-1 clock request signal REQ1-1) if (e.g., in response to a determination that) the enable signal is a deactivation signal (e.g., in response to a determination that the enable signal is a deactivation signal concurrently with receiving the start signal).

For example, as shown in FIG. 7A, when the 1-3 enable register 150-3 generates a high-level activation signal in response to the enable control signal received from the CPU 200, the 1-3 clock consumer 1201-3 may, in response, generate the 1-3 clock request signal REQ1-3 at first time t1 at which the start signal changes to a high level (e.g., in response to the start signal changing to a high level) and transmit the generated 1-3 clock request signal REQ1-3 to the first block clock management unit 130-1 and may receive a 1-3 clock signal CLK1-3 corresponding to the 1-3 clock request signal REQ1-3 at first time t1.

For example, as shown in FIG. 7B, if the 1-3 enable register 150-3 generates a low-level deactivation signal in response to the enable control signal received from the CPU 200, the 1-3 clock consumer 1201-3 may, in response, not generate (e.g., may block generation of) the 1-3 clock request signal REQ1-3 and may not receive the 1-3 clock signal CLK1-3 at first time t1 at which the start signal changes to a high level. At this time (e.g., at first time t1), the 1-3 clock consumer 1201-3 may perform a bypass operation of outputting (e.g., transmitting) the input image data as is without image processing. The bypass operation may be performed without a clock (e.g., without any clock).

According to some example embodiments, it is possible to control the clock supply (e.g., control the supply of one or more clock signals) to at least one IP block among a plurality of IP blocks included in an image sensor that is configured to perform image processing for a particular (or, alternatively, predetermined) image frame which may be a limited image frame (e.g., the clock may be controlled to be supplied to the at least one IP block only for the particular image frame that the at least one IP block is performing the image processing operation and not during an image frame for which the at least one IP block is not performing the image processing operation, as indicated by non-transmission of a clock request signal from the at least one IP block) or for a particular (or, alternatively, predetermined) period of time which may be a limited period of time (e.g., the clock may be controlled to be supplied to the at least one IP block only for the particular period of time during which the at least one IP block is performing the image processing operation and not during a separate particular period of time during which the at least one IP block is not performing the image processing operation, as indicated by non-transmission of a clock request signal from the at least one IP block), thereby reducing or minimizing power (e.g., power consumption by the image sensor 100) due to unnecessary clock supply. As a result, the image sensor 100 may be configured to operate with a reduced or minimized power consumption without compromising operational performance (e.g., without degradation in image processing operations performed by the image sensor 100, with reduced, minimized, or prevented data loss in such image processing operations, etc.). Thus, the functionality of the image sensor 100 may be improved.

Figure 8:
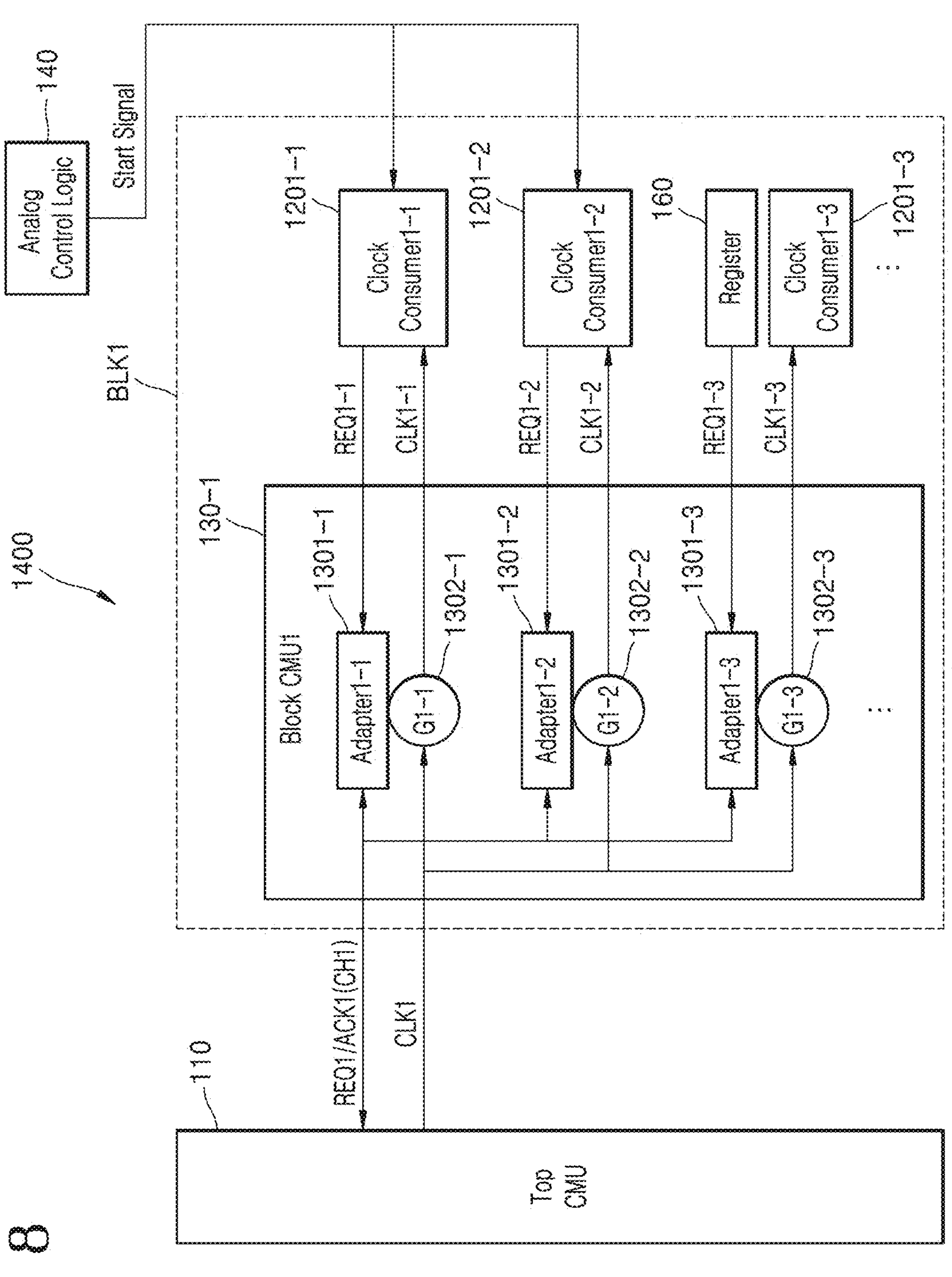
FIG. 8 is a block diagram illustrating a block of an image signal processor according to some example embodiments.

FIG. 8 is a block diagram illustrating a block of the image signal processor 1400 according to some example embodiments.

Figure 9:
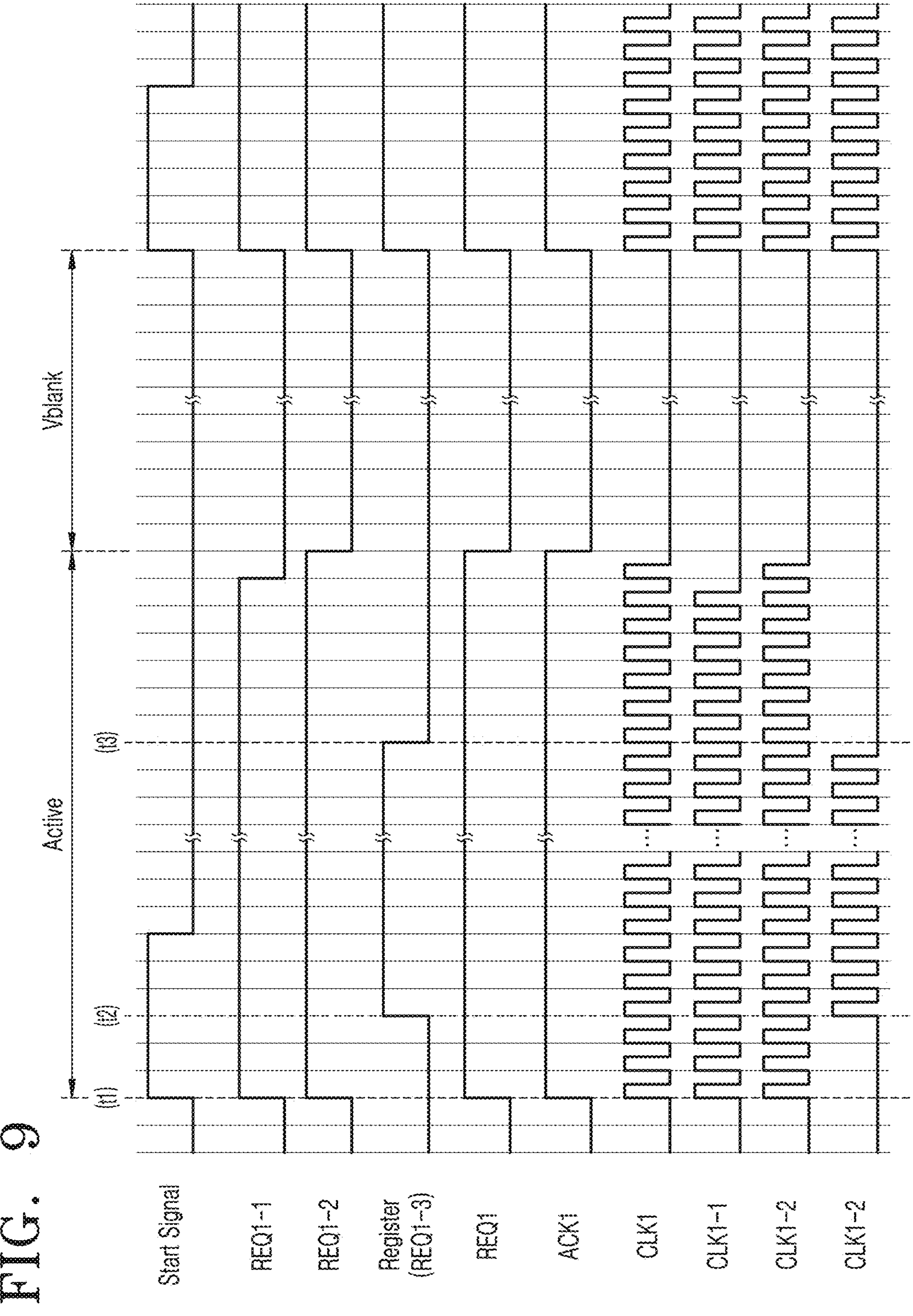
FIG. 9 is a timing diagram illustrating signals according to the operation of a block of an image signal processor according to some example embodiments.

FIG. 9 is a timing diagram illustrating signals according to an operation of a block of the image signal processor 1400 according to some example embodiments.

Referring to FIGS. 8 and 9, the analog control logic 140 may transmit a start signal to the 1-1 clock consumer 1201-1 and the 1-2 clock consumer 1201-2.

Meanwhile, the register 160 may generate the 1-3 clock request signal REQ1-3, and the 1-3 clock consumer 1201-3 may receive the 1-3 clock signal CLK1-3 corresponding to the 1-3 clock request signal REQ1-3 generated by the register 160. In some example embodiments, the register 160 may transmit the 1-3 clock request signal REQ1-3 to the 1-3 clock consumer 1201-3, and the 1-3 clock consumer 1201-3 may transmit the 1-3 clock request signal REQ1-3 to the block clock management unit 130-1 (e.g., to the 1-3 adapter 1301-3) based on receiving the 1-3 clock request signal REQ1-3 from the register 160, such that generating of the 1-3 clock request signal REQ1-3 by the 1-3 clock consumer 1201-3 may include receiving the 1-3 clock request signal REQ1-3 from the register 160.

The 1-3 clock consumer 1201-3 may not receive a start signal (e.g., may not receive any start signal) from the analog control logic 140. Therefore, the 1-3 clock consumer 1201-3 may receive the 1-3 clock signal CLK1-3 regardless of the start signal.

When the 1-3 clock request signal REQ1-3 is transmitted from the register 160 (e.g., in response to such transmission), the 1-3 adapter 1301-3 may control the 1-3 clock gate unit 1302-3 to transmit the second clock signal CLK1 as the 1-3 clock signal CLK1-3 to the 1-3 clock consumer 1201-3. For example, the register 160 may generate the 1-3 clock request signal REQ1-3 at second time t2, rather than first time t1 at which a start signal is provided, and transmit the generated 1-3 clock request signal REQ1-3 to the 1-3 adapter 1301-3, and the 1-3 adapter 1301-3 may control the 1-3 clock gate unit 1302-3 to transmit the 1-3 clock signal CLK1-3 to the 1-3 clock consumer 1201-3 at second time t2.

That is, the 1-1 clock consumer 1201-1 and the 1-2 clock consumer 1201-2 may generate the 1-1 clock signal CLK1-1 and the 1-2 clock signal CLK1-2 at first time t1 at which the start signal is received and transmit them to the first block clock management unit 130-1, and the register 160 may generate the 1-3 clock request signal REQ1-3 at second time t2, different from the first time t1, and transmit the 1-3 clock request signal REQ1-3 to the first block clock management unit 130-1.

When transmission of the 1-3 clock request signal REQ1-3 from the register 160 is stopped at third time t3 (e.g., in response to the transmission of the 1-3 clock request signal REQ1-3 from the register 160 being stopped at third time t3), the 1-3 adapter 1301-3 may control the 1-3 clock gate unit 1302-3 to block transmission of the 1-3 clock signal CLK1-3 to the 1-3 clock consumer 1201-3 at third time t3.

According to some example embodiments, because the clock supply to at least one IP block, among the IP blocks included in the image sensor 100, that is configured to perform image processing independently regardless of a start signal may be controlled, power (e.g., power consumption) of the image sensor 100 due to unnecessary clock supply may be reduced or minimized. As a result, the image sensor 100 may be configured to operate with a reduced or minimized power consumption without compromising operational performance (e.g., without degradation in image processing operations performed by the image sensor 100, with reduced, minimized, or prevented data loss in such image processing operations, etc.). Thus, the functionality of the image sensor 100 may be improved.

Figure 10:
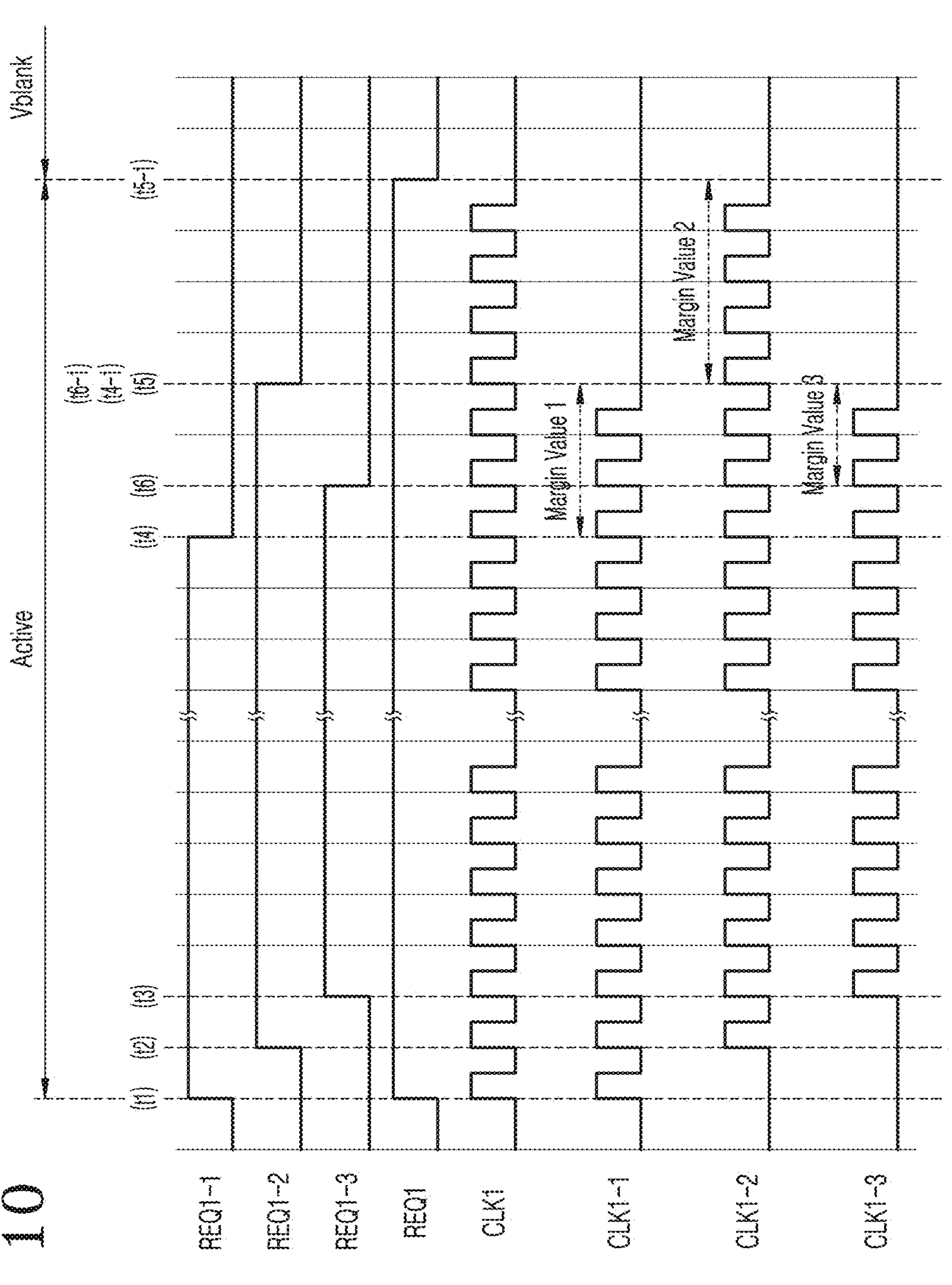
FIG. 10 is a timing diagram illustrating signals according to the operation of a block of an image signal processor according to some example embodiments.

FIG. 10 is a timing diagram illustrating signals according to an operation of a block of the image signal processor 1400 according to some example embodiments.

Referring to FIG. 10, the first block clock management unit 130-1 may transmit the 1-1 clock signal CLK1-1 corresponding to the 1-1 clock request signal REQ1-1 to the 1-1 clock consumer 1201-1 during a period from first time t1 at which reception of the 1-1 clock request signal REQ1-1 starts to 4-1 time t4-1 in which a first margin value (Margin Value 1) has elapsed since fourth time t4 at which reception of the 1-1 clock signal CLK1-1 was stopped. The margin value may be set in advance and changed via the controller (1300 in FIG. 1).

The first block clock management unit 130-1 may transmit the 1-2 clock signal CLK1-2 corresponding to the 1-2 clock request signal REQ1-2 to the 1-2 clock consumer 1201-2 during a period from second time t2 at which reception of the 1-2 clock request signal REQ1-2 starts to 5-1 time t5-1 in which a second margin value (Margin Value 2) has elapsed since fifth time t5 at which reception of the 1-2 clock request signal REQ1-2 was stopped. The first block clock management unit 130-1 may transmit the 1-3 clock signal CLK1-3 corresponding to the 1-3 clock request signal REQ1-3 to the 1-3 clock consumer 1201-3 during a period from third time t3 at which reception of the 1-3 clock request signal REQ1-3 starts to 6-1 time t6-1 in which a third margin value (Margin Value 3) has elapsed since sixth time t6 at which reception of the 1-3 clock request signal REQ1-3 was stopped.

The first margin value (Margin Value 1) may be 3 cycles, the second margin value (Margin Value 2) may be 4 cycles, and the third margin value (Margin Value 3) may be 2 cycles. That is, the margin values for the 1-1 clock consumer 1201-1, the 1-2 clock consumer 1201-2, and the 1-3 clock consumer 1201-3 may be different from each other but are not limited thereto.

According to some example embodiments, the latency of clock supply to a clock consumer may be reduced or minimized based on the clock consumer retransmitting a clock request signal within a margin value of time after transmission of the clock request signal of the clock consumer stops, thereby enhancing the stability of an image processing operation of the image sensor 100 and thereby improving the operational performance (e.g., image processing performance) and/or operational reliability of the image sensor 100.

Figure 11:
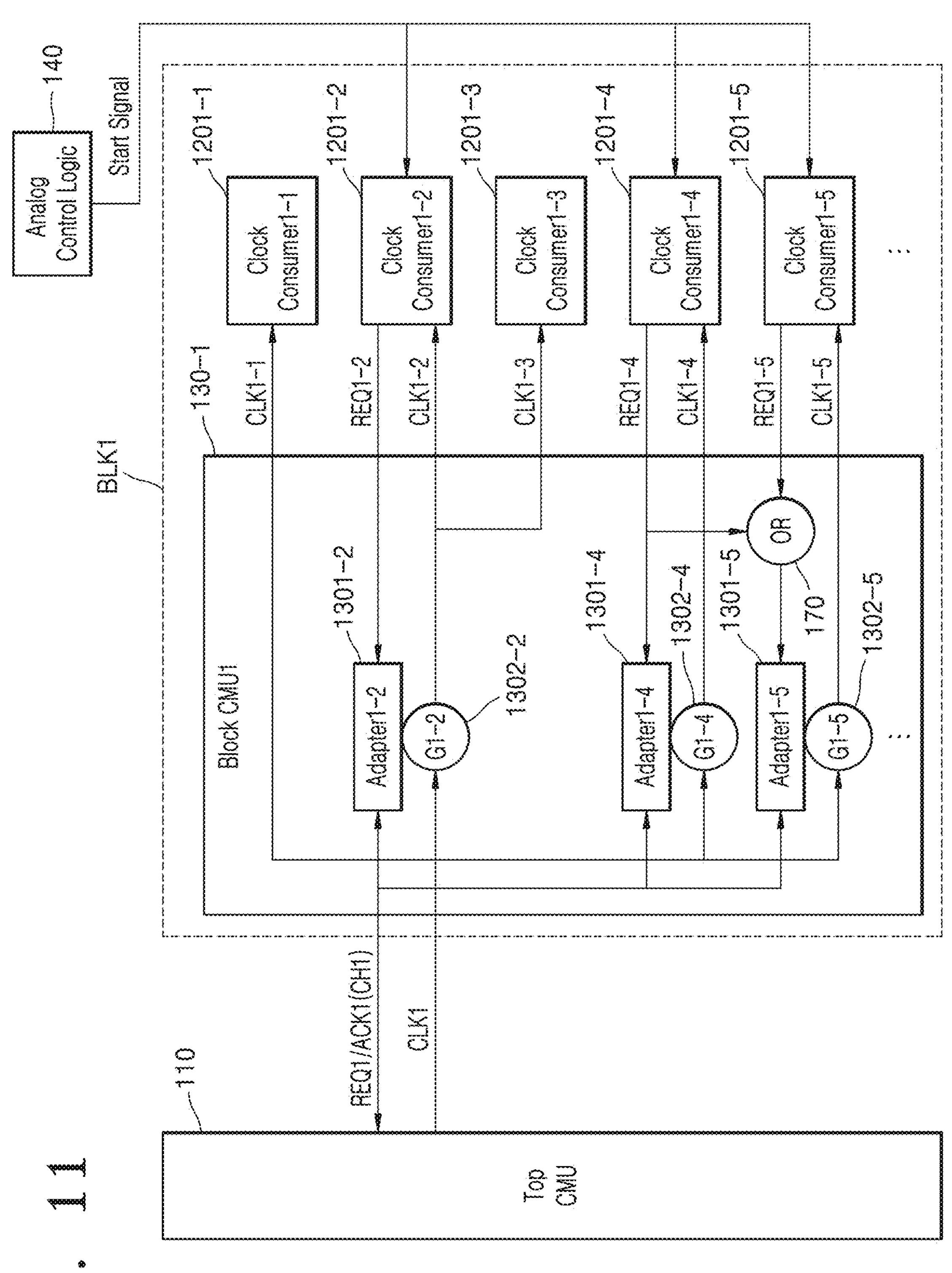
FIG. 11 is a block diagram illustrating a block of an image signal processor according to some example embodiments.

FIG. 11 is a block diagram illustrating a block of the image signal processor 1400 according to some example embodiments.

Figure 12:
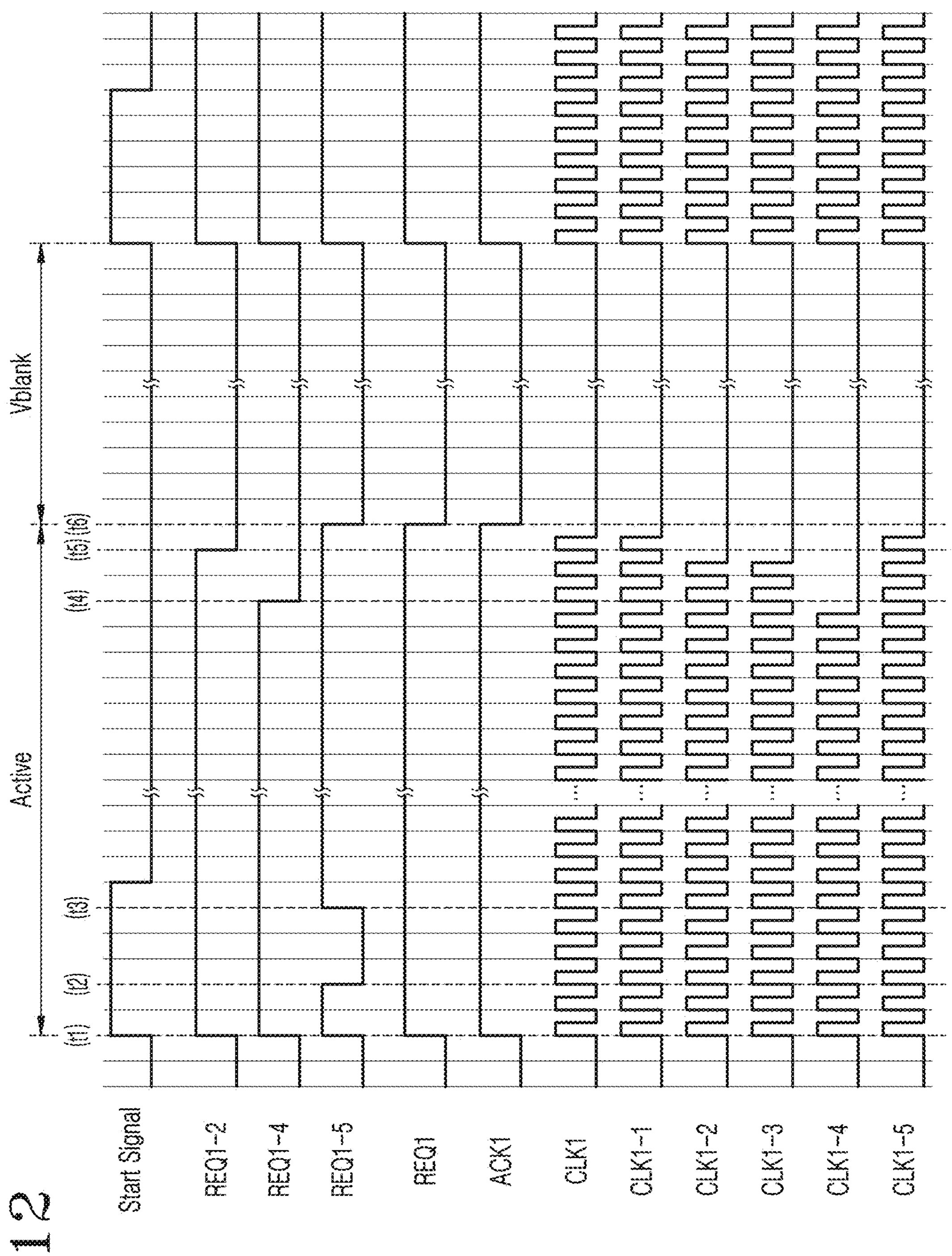
FIG. 12 is a timing diagram illustrating signals according to the operation of a block of an image signal processor according to some example embodiments.

FIG. 12 is a timing diagram illustrating signals according to an operation of blocks of the image signal processor 1400 according to some example embodiments.

Referring to FIGS. 11 and 12, the first block BLK1 may include a first block clock management unit 130-1 and a 1-1 clock consumer 1201-1 to a 1-5 clock consumer 1201-5.

The first block clock management unit 130-1 may include a 1-2 adapter 1301-2, a 1-4 adapter 1301-4, a 1-5 adapter 1301-5, a 1-2 clock gate unit 1302-2, a 1-4 clock gate unit 1302-4, a 1-5 clock gate unit 1302-5, and an OR gate unit 170.

The 1-1 clock consumer 1201-1 may not receive a start signal (e.g., may not receive any start signal) from the analog control logic 140, and a corresponding clock gate unit and adapter may be absent.

The 1-2 clock consumer 1201-2 and the 1-3 clock consumer 1201-3 may receive the 1-2 clock signal CLK1-2 corresponding to the 1-2 clock request signal REQ1-2 generated by the 1-2 clock consumer 1201-2 and transmitted to the first block clock management unit 130-1. The 1-3 clock consumer 1201-3 may not receive a start signal from the analog control logic 140, and a corresponding clock gate unit and adapter may be absent. The 1-3 clock consumer 1201-3 may share the 1-2 adapter 1301-2 and the 1-2 clock gate unit 1302-2 with the 1-2 clock consumer 1201-2. For example, when the 1-2 clock request signal REQ1-2 is transmitted from the 1-2 clock consumer 1201-2 (e.g., in response to such transmission), the 1-2 adapter 1301-2 may control the 1-2 clock gate unit 1302-2 to transmit the second clock signal CLK1 as a 1-2 clock signal CLK1-2 and a 1-3 clock signal CLK1-3 to the 1-2 clock consumer 1201-2 and the 1-3 clock consumer 1201-3. That is, the 1-2 clock signal CLK1-2 and the 1-3 clock signal CLK1-3 may be the same clock signal.

When transmission of the 1-2 clock request signal REQ1-2 from the 1-2 clock consumer 1201-2 is stopped (e.g., in response to such transmission being stopped), the 1-2 adapter 1301-2 may control the 1-2 clock gate unit 1302-2 to block transmission of the 1-2 clock signal CLK1-2 and the 1-3 clock signal CLK1-3 to the 1-2 clock consumer 1201-2 and the 1-3 clock consumer 1201-3. Accordingly, the 1-2 clock consumer 1201-2 and the 1-3 clock consumer 1201-3 may receive the 1-2 clock signal CLK1-2 corresponding to the 1-2 clock request signal REQ1-2 (e.g., may receive the 1-2 clock signal CLK1-2 and the 1-3 clock signal CLK1-3, respectively) during a period from first time t1 at which transmission of the 1-2 clock request signal REQ1-2 starts to fifth time t5 at which transmission of the 1-2 clock request signal REQ1-2 stops. That is, the 1-3 clock consumer 1201-3 may operate during the same period as the 1-2 clock consumer 1201-2.

According to some example embodiments, the number of adapters and clock gate units included in the image sensor 100 may be reduced, thereby reducing power (e.g., power consumption) of the image sensor 100. As a result, the image sensor 100 may be configured to operate with a reduced or minimized power consumption without compromising operational performance (e.g., without degradation in image processing operations performed by the image sensor 100, with reduced, minimized, or prevented data loss in such image processing operations, etc.). Thus, the functionality of the image sensor 100 may be improved.

The 1-4 clock consumer 1201-4 may receive a 1-4 clock signal CLK1-4 corresponding to a 1-4 clock request signal REQ1-4 generated by the 1-4 clock consumer 1201-4 and transmitted to the first block clock management unit 130-1, and the 1-5 clock consumer 1201-5 may receive a 1-5 clock signal CLK1-5 corresponding to at least one of the 1-4 clock request signal REQ1-4 or a 1-5 clock request signal REQ1-5 generated by the 1-5 clock consumer 1201-5 and transmitted to the first block clock management unit 130-1.

The OR gate unit 170 may receive at least one of the 1-4 clock request signal REQ1-4 or the 1-5 clock request signal REQ1-5 from the 1-4 clock consumer 1201-4 and the 1-5 clock consumer 1201-5 and may transmit at least one of the 1-4 clock request signal REQ1-4 or the 1-5 clock request signal REQ1-5 to the 1-5 adapter 1301-5.

Accordingly, when at least one of the 1-4 clock request signal REQ1-4 or the 1-5 clock request signal REQ1-5 is received (e.g., in response to such receipt at the 1-5 adapter 1301-5), the 1-5 adapter 1301-5 may control the 1-5 clock gate unit 1302-5 to transmit the 1-5 clock signal CLK1-5 corresponding to at least one of the 1-4 clock request signal REQ1-4 or the 1-5 clock request signal REQ1-5 to the 1-5 clock consumer 1201-5, and when reception of both the 1-4 clock request signal REQ1-4 and the 1-5 clock request signal REQ1-5 is stopped (e.g., in response to such reception stopping, in response to transmission of both of the 1-4 clock request signal REQ1-4 and the 1-5 clock request signal REQ1-5 being stopped), the 1-5 adapter 1301-5 may control the 1-5 clock gate unit 1302-5 to block transmission of the 1-5 clock signal CLK1-5 to the 1-5 clock consumer 1201-5. The 1-5 clock consumer 1201-5 may receive a 1-5 clock signal CLK1-5 corresponding to at least one of the 1-4 clock request signal REQ1-4 or the 1-5 clock request signal REQ1-5. Accordingly, the 1-5 clock consumer 1201-5 may receive the 1-5 clock signal CLK1-5 in response to the transmission of the 1-4 clock request signal REQ1-4 even during a period from second time t2 to third time t3 in which the transmission of the 1-5 clock request signal REQ1-5 is stopped. That is, the 1-5 clock consumer 1201-5 may operate during the same period as the 1-4 clock consumer 1201-4. Meanwhile, the 1-5 clock consumer 1201-5 may operate even during a period unrelated to the operation of the 1-4 clock consumer 1201-4.

The 1-1 clock consumer 1201-1 may not receive a start signal from the analog control logic 140 (e.g., may not receive any start signal), and a corresponding clock gate unit and adapter may be absent. The 1-1 clock consumer 1201-1 may receive the second clock signal CLK1 as the 1-1 clock signal CLK1-1. For example, the first block clock management unit 130-1 may generate the second clock request signal REQ1 and transmit it to the top clock management unit 110 and receive the second clock signal CLK1 corresponding to the second clock request signal REQ1 during a period from first time t1 at which at least one of the 1-2 clock request signal REQ1-2, the 1-4 clock request signal REQ1-4, or the 1-5 clock request signal REQ1-5 is received to sixth time t6 at which reception of all of the 1-2 clock request signal REQ1-2, the 1-4 clock request signal REQ1-4, and the 1-5 clock request signal REQ1-5 is stopped. Accordingly, the 1-1 clock consumer 1201-1 may receive the second clock signal CLK1 as the 1-1 clock signal CLK1-1 during the period from first time t1 to sixth time t6 in which the second clock signal CLK1 is received.

According to some example embodiments, clock control suitable for the image sensor 100 may be performed based on a relationship between clock consumers.

Figure 13:
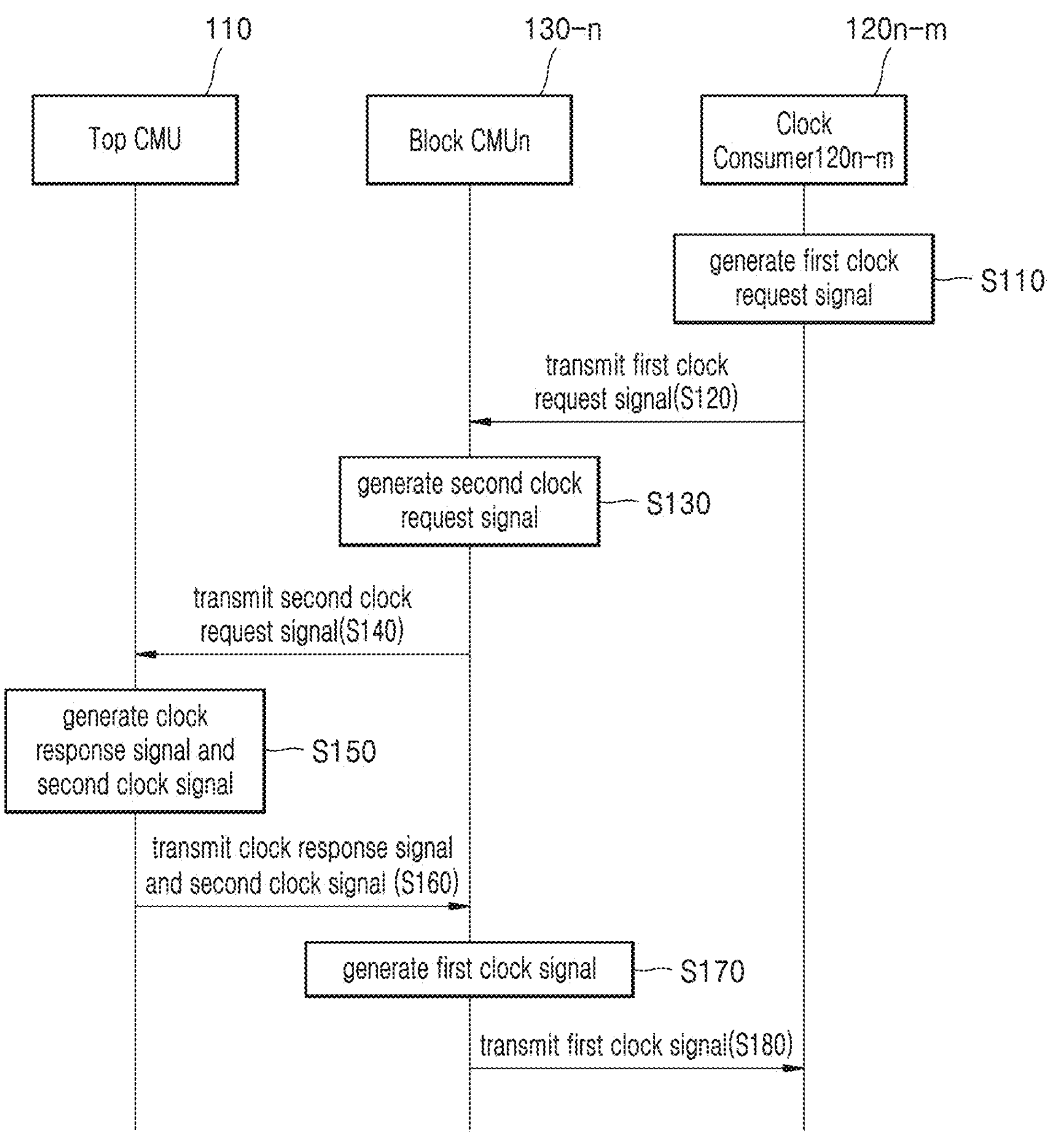
FIG. 13 is a flowchart illustrating an operating method of an image sensor, according to some example embodiments.

FIG. 13 is a flowchart illustrating an operating method of an image sensor according to some example embodiments. The operating method may be implemented by an image sensor according to some example embodiments, including the image sensor 100 according to some example embodiments.

Hereinafter, n may refer to the number (e.g., quantity) of blocks, m may refer to the number (e.g., quantity) of clock consumers, and n and m may each be 1 or greater. That is, one top clock management unit may manage n blocks, and one block clock management unit may manage m clock consumers. The number of clock consumers managed by each block clock management unit may be the same or different.

Referring to FIG. 13, n-m-th clock consumer 120*n-m* generates a first clock request signal (S110) and transmits the first clock request signal to an n-th block clock management unit 130-*n* (S120).

The clock consumer or register (160 in FIG. 8) may determine when to generate a clock request signal. For example, the clock consumer may generate the clock request signal at the time it receives (e.g., in response to receiving) a start signal from the analog control logic (140 in FIG. 3). The start signal may be a signal transmitted simultaneously to a plurality of clock consumers, and the clock request signal generated by the register (160 in FIG. 8) may be a signal generated only for a certain clock consumer. The start signal may be maintained for a plurality of cycles, and a time at which the start signal changes from a low level to a high level, the number of cycles for which the start signal is maintained, and the time at which the start signal changes from a high level to a low level may be determined in advance and changed by the controller (1300 in FIG. 1). The n block clock management unit 130-*n* generates a second clock request signal corresponding to the first clock request signal (S130) and transmits the second clock request signal to the top clock management unit 110 (S140).

The n block clock management unit 130-*n* may generate a second clock request signal when receiving the first clock request signal (e.g., in response to receiving the first clock request signal) from one of m clock consumers and may stop generating the second clock request signal when receiving the first clock request signal from all of m clock consumers is stopped (e.g., in response to transmission of the first clock request signal from all of m clock consumers being stopped).

Operations S110 to S140 may be operations that may be performed without a clock.

The top clock management unit 110 generates a clock response signal and a second clock signal in response to the second clock request signal (S150) and transmits the clock response signal and the second clock signal to the n block clock management unit 130-*n* (S160). Operations S140 and S150 may indicate that a handshake method is applied to a communication method between the top clock management unit 110 and the n block clock management unit 130-*n*.

The n block clock management unit 130-*n* generates a first clock signal corresponding to the first clock request signal based on the second clock signal (S170) and transmits the first clock signal to the n-m clock consumer 120*n-m* (S180).

In operation S170, the n block clock management unit 130-*n* may transmit the first clock signal to the n-m clock consumer 120*n-m* without generating a clock response signal corresponding to the first clock signal and transmitting the same to the n-m clock consumer 120*n-m*, which may indicate that a communication method between the n block clock management unit 130-*n* and the n-m clock consumer 120*n-m* is unrelated to the handshake method.

Transmission of the first clock signal by the n block clock management unit 130-*n* to the n-m clock consumer 120*n-m* may be maintained until a time at which transmission of the first clock request signal of the n-m clock consumer 120*n-m* is stopped, but example embodiments are not limited thereto. Transmission of the first clock signal by the n block clock management unit 130-*n* to the n-m clock consumer 120*n-m* may be maintained until a time at which a margin value has elapsed after the time at which transmission of the first clock request signal of the n-m clock consumer 120*n-m* is stopped.

That is, according to some example embodiments, the top clock management unit and the block clock management unit may only provide a clock signal based on a clock request signal of a clock consumer and cannot provide a clock signal regardless of the clock request signal of the clock consumer.

FIG. 14 is a block diagram illustrating an image processing device 2000 according to some example embodiments.

The image processing device 2000 of FIG. 14 may be a portable terminal.

Referring to FIG. 14, the image processing device 2000 according to some example embodiments may include an application processor (AP) 2100, an image sensor 2200, a display device 2400, a working memory 2500, storage 2600, a user interface 2700, and a wireless transceiver 2800.

The AP 2100 may control the overall operation of the image processing device 2000 and may be provided as a system on chip (SoC) that runs application programs, operating systems, etc.

The AP 2100 may provide image data received from the image sensor 2200 to the display device 2400 or store the image data in the storage 2600. In some example embodiments, the AP 2100 may further include an image signal processor that performs image processing on the image data received from the image sensor 2200. The image signal processor provided in the AP 2100 may perform various image processing on the image data, such as noise removal, demosaicing, sharpening, and high dynamic range (HDR) processing.

The image sensor 2200 may generate image data, such as raw image data, based on a received optical signal and provide the image data to the image signal processor 2300.

The image sensor 2200 may be an image sensor 100 according to some example embodiments, including an image sensor 100 as described above with reference to any one or more of FIGS. 1 to 12. The image sensor 2200 may, as described above with reference to the image sensor 100 and any one or more of FIGS. 1 to 12, include a plurality of clock consumers, a plurality of block clock management units, and a top clock management unit, and each block clock management unit may transmit a second clock request signal to the top clock management unit in response to a first clock request signal received from at least one clock consumer among the clock consumers, the top clock management unit may transmit each clock response signal corresponding to each second clock request signal, and the top clock management unit may transmit the second clock signal to each block clock management unit through a channel formed by transmission and reception of the second clock request signal and the clock response signal. While the second clock signal is transmitted through the channel (e.g., in response to such transmission), each block clock management unit may transmit a first clock signal corresponding to the first clock request signal to a clock consumer that has transmitted the first clock request signal among the clock consumers based on the second clock signal. Accordingly, the image sensor 2200 may supply clocks only when necessary for performing image processing for each of the clock consumers, thereby reducing power consumption due to unnecessary clock supply. As a result, the image sensor 2200, and thus the image processing device 2000 including same, may be configured to operate with a reduced or minimized power consumption without compromising operational performance (e.g., without degradation in image processing operations performed by the image sensor 100, with reduced, minimized, or prevented data loss in such image processing operations, etc.). Thus, the functionality of the image sensor 2200, and thus the image processing device 2000, may be improved.

The working memory 2500 may be implemented as a volatile memory, such as DRAM, SRAM, etc. or a nonvolatile resistive memory, such as FeRAM, RRAM, or PRAM. The working memory 2500 may store programs and/or data processed or executed by the AP 2100.

The storage 2600 may be implemented as a nonvolatile memory device, such as NAND flash, resistive memory, etc., and for example, the storage 2600 may be provided as a memory card (MMC, eMMC, SD, micro SD), etc. The storage 2600 may store data and/or programs for execution algorithms that control an image processing operation of the image signal processor 2300, and the data and/or programs may be loaded into the working memory 2500 when the image processing operation is performed. In some example embodiments, the storage 2600 may store image data generated by the image signal processor 2300, such as transformed image data or post-processed image data.

The user interface 2700 may be implemented as various devices capable of receiving user input, such as a keyboard, curtain key panel, touch panel, fingerprint sensor, and microphone. The user interface 2700 may receive user input and provide a signal corresponding to the received user input to the AP 2100.

The wireless transceiver 2800 may include a transceiver 2810, a modem 2820, and an antenna 2830.

As described herein, any devices, systems, modules, portions, units, blocks, controllers, circuits, and/or portions thereof according to any of the example embodiments, and/or any portions thereof (including, without limitation, the image sensor 100, the pixel array 1100, the readout circuit 1200, the control logic circuit 1300, the image signal processor 1400, the output circuit 1500, the plurality of IP blocks 1410, the first IP block 1411, the second IP block 1412, the third IP block 1413, the top clock management unit 110, the plurality of blocks 120, the block clock management units 130-1 to **130-*n*, the analog control logic 140, the OR gate unit 170, the plurality of clock consumers 1201-1 to 120*n-m*, the plurality of adaptors 1301-1 to 1301-*m*, the plurality of clock gate units 1302-1 to 1302-*m*, the plurality of enable registers 150-1 to 150-3, the register 160, the CPU 200, the image processing device 2000, the AP 2100, the image sensor 2200, the image signal processor 2300, the display device 2400, the working memory 2500, the storage 2600, the user interface 2700, the wireless transceiver 2800**, any portion thereof, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, systems, modules, portions, units, blocks, controllers, circuits, and/or portions thereof according to any of the example embodiments.

While the inventive concepts have been particularly shown and described with reference to some example embodiments thereof, it will be understood that various changes in form and details may be made therein without departing from the spirit and scope of the following claims.

What is claimed is:

1. An image sensor, comprising:

a pixel array including a plurality of sensing pixels;

a readout circuit configured to convert electrical signals received from the pixel array into image data; and an image signal processor configured to process the image data output from the readout circuit, wherein the image signal processor includes a clock consumer configured to generate a first clock request signal and receive a first clock signal corresponding to the first clock request signal, a block clock management unit configured to receive the first clock request signal from the clock consumer, generate a second clock request signal corresponding to the first clock request signal, and receive a clock response signal and a second clock signal corresponding to the second clock request signal, and a top clock management unit configured to receive the second clock request signal from the block clock management unit, generate the clock response signal and the second clock signal corresponding to the second clock request signal, and transmit the clock response signal and the second clock signal to the block clock management unit, and wherein the block clock management unit is configured to generate the first clock signal corresponding to the first clock request signal, based on the second clock signal, and transmit the first clock signal to the clock consumer.

2. The image sensor of claim 1, wherein the block clock management unit is configured to transmit the first clock signal corresponding to the first clock request signal from a time at which reception of the first clock request signal starts to a time at which reception of the first clock request signal stops.

3. The image sensor of claim 1, wherein the block clock management unit includes:

a clock gate unit configured to transmit the first clock signal, and an adapter configured to control the clock gate unit, and the adapter is configured to transmit the first clock signal through the clock gate unit in response to the first clock request signal being transmitted from the clock consumer, and block transmission of the first clock signal by the clock gate unit in response to transmission of the first clock request signal from the clock consumer being stopped.

4. The image sensor of claim 1, further comprising:

an analog control logic configured to transmit a start signal indicating an end point of a vertical blank period of an image frame to the clock consumer, wherein the clock consumer is configured to generate the first clock request signal in response to the start signal.

5. The image sensor of claim 1, further comprising:

an analog control logic configured to transmit a start signal indicating an end point of a vertical blank period of an image frame to the clock consumer; and an enable register configured to generate an enable signal for controlling activation of operation of the clock consumer to the clock consumer, wherein the clock consumer is configured to generate the first clock request signal in response to the start signal based on the enable signal being an activation signal, and refrain from responding to the start signal based on the enable signal being a deactivation signal.

6. The image sensor of claim 1, further comprising:

a register configured to control activation of operation of the clock consumer, wherein the register is configured to generate the first clock request signal.

7. The image sensor of claim 1, wherein the block clock management unit is configured to transmit the first clock signal corresponding to the first clock request signal from a time at which reception of the first clock request signal starts to a time at which a margin value has elapsed since reception of the first clock request signal was stopped.

8. An image sensor, comprising:

a plurality of clock consumers, each clock consumer of the plurality of clock consumers configured to generate a first clock request signal and receive a first clock signal corresponding to the first clock request signal;

a block clock management unit configured to receive the first clock request signal from each of the plurality of clock consumers, generate a second clock request signal corresponding to the first clock request signal, and receive a clock response signal and a second clock signal corresponding to the second clock request signal; and a top clock management unit configured to receive the second clock request signal from the block clock management unit, generate the clock response signal and the second clock signal corresponding to the second clock request signal, and transmit the clock response signal and the second clock signal to the block clock management unit, wherein the block clock management unit is configured to generate the first clock signal corresponding to the first clock request signal, based on the second clock signal, and transmit the first clock signal to each of the plurality of clock consumers, and wherein the block clock management unit is configured to generate the second clock request signal in response to receiving the first clock request signal from at least one clock consumer among the plurality of clock consumers, and stop generating the second clock request signal in response to transmission of the first clock request signal from all of the plurality of clock consumers being stopped.

9. The image sensor of claim 8, wherein the top clock management unit is configured to transmit and receive the second clock request signal, the clock response signal, and the second clock signal to and from each of a plurality of block clock management units, the plurality of block clock management units including the block clock management unit.

10. The image sensor of claim 8, wherein the plurality of clock consumers include a first clock consumer and a second clock consumer, wherein the image sensor further comprises:

an analog control logic configured to transmit a start signal indicating an end point of a vertical blank period of an image frame to the first clock consumer, and a register configured to control activation of operation of the second clock consumer, and the first clock consumer is configured to generate the first clock request signal in response to the start signal, and the first clock request signal of the second clock consumer is generated by the register.

11. The image sensor of claim 10, wherein the first clock consumer is configured to generate the first clock request signal at a time that is different from a time at which the register generates the first clock request signal.

12. The image sensor of claim 8, wherein the block clock management unit is configured to transmit the first clock signal corresponding to the first clock request signal from a time at which reception of the first clock request signal starts to a time at which a margin value has elapsed since reception of the first clock request signal was stopped, and the plurality of clock consumers include a first clock consumer and a second clock consumer, and a first margin value of the first clock consumer is different from a second margin value of the second clock consumer.

13. The image sensor of claim 8, wherein the plurality of clock consumers include a first clock consumer and a second clock consumer, and the first clock consumer and the second clock consumer are each configured to receive the first clock signal corresponding to the first clock request signal generated by the first clock consumer.

14. The image sensor of claim 8, wherein the plurality of clock consumers include a first clock consumer and a second clock consumer, the first clock consumer is configured to receive the first clock signal corresponding to the first clock request signal generated by the first clock consumer, and the second clock consumer is configured to receive the first clock signal corresponding to at least one of the first clock request signal generated by the first clock consumer or the first clock request signal generated by the second clock consumer.

15. An operating method of an image sensor, the image sensor including a clock consumer, a block clock management unit, and a top clock management unit, the operating method comprising:

generating, by the clock consumer, a first clock request signal;

transmitting, by the clock consumer, the first clock request signal to the block clock management unit;

generating, by the block clock management unit, a second clock request signal corresponding to the first clock request signal;

transmitting, by the block clock management unit, the second clock request signal to the top clock management unit;

generating, by the top clock management unit, a clock response signal and a second clock signal corresponding to the second clock request signal;

transmitting, by the top clock management unit, the clock response signal and the second clock signal to the block clock management unit;

transmitting, by the block clock management unit, a first clock signal corresponding to the first clock request signal to the clock consumer, based on the second clock signal; and stopping, by the block clock management unit, transmission of the first clock signal to the clock consumer in response to transmission of the first clock request signal by the clock consumer being stopped.

16. The operating method of claim 15, further comprising:

stopping, by the block clock management unit, transmission of the first clock signal to the clock consumer in response to transmission of the first clock request signal by the clock consumer being stopped.

17. The operating method of claim 15, wherein the image sensor further includes an analog control logic, and the generating of the first clock request signal by the clock consumer includes generating, by the clock consumer, the first clock request signal in response to a start signal indicating an end point of a vertical blank period of an image frame received from the analog control logic.

18. The operating method of claim 15, wherein the image sensor further includes an analog control logic and an enable register, and the generating of the first clock request signal by the clock consumer includes generating, by the clock consumer, the first clock request signal in response to a start signal indicating an end point of a vertical blank period of an image frame received from the analog control logic and an enable signal for controlling activation of operation of the clock consumer generated by the enable register being an activation signal.

19. The operating method of claim 15, wherein the image sensor further includes a register, and the generating of the first clock request signal by the clock consumer includes receiving, by the clock consumer, the first clock request signal from the register.

20. The operating method of claim 15, wherein the stopping, by the block clock management unit, transmission of the first clock signal to the clock consumer in response to transmission of the first clock request signal by the clock consumer being stopped includes stopping, by the block clock management unit, transmission of the first clock signal to the clock consumer at a time at which a particular cycle has elapsed since a time at which reception of the first clock request signal by the clock consumer was stopped.

* * * * *